United States Patent
Suh

(10) Patent No.: US 11,659,386 B2
(45) Date of Patent: May 23, 2023

(54) METHOD AND APPARATUS FOR AUTHENTICATING TERMINAL AND NETWORK IN 5G COMMUNICATION SYSTEM

(71) Applicant: Samsung Electronics Co., Ltd., Suwon-si (KR)

(72) Inventor: Kyungjoo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 16/644,375

(22) PCT Filed: Sep. 5, 2018

(86) PCT No.: PCT/KR2018/010375
§ 371 (c)(1),
(2) Date: Mar. 4, 2020

(87) PCT Pub. No.: WO2019/050278
PCT Pub. Date: Mar. 14, 2019

(65) Prior Publication Data
US 2021/0076209 A1    Mar. 11, 2021

(30) Foreign Application Priority Data
Sep. 6, 2017  (KR) .......................... 10-2017-0113657

(51) Int. Cl.
*H04L 29/00* (2006.01)
*H04W 12/06* (2021.01)
(Continued)

(52) U.S. Cl.
CPC ............. *H04W 12/06* (2013.01); *H04W 8/08* (2013.01); *H04W 12/106* (2021.01); *H04W 76/10* (2018.02)

(58) Field of Classification Search
CPC ... H04W 12/06; H04W 76/10; H04W 12/106; H04W 8/08
(Continued)

(56) References Cited

U.S. PATENT DOCUMENTS

2017/0171752 A1*  6/2017  Lee ..................... H04W 76/12
2017/0222983 A1   8/2017  Boening et al.

FOREIGN PATENT DOCUMENTS

KR   10-2015-0083406 A   7/2015
WO      2017/142362 A1   8/2017

OTHER PUBLICATIONS

Junseok Kim, Dongmyoung Kim, Sunghyun Choi / 3GPP SA2 architecture and functions for 5G mobile communication system / Apr. 13, 2017 / Science Direct / pp. 1-8 (Year: 2017).*

(Continued)

*Primary Examiner* — Brandon Hoffman
*Assistant Examiner* — Michael D Anderson
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention relates to an authentication method applied to a next generation 5G communication system and an apparatus for performing same, network slices, a method for managing the network slices, and an apparatus for performing the same.

10 Claims, 23 Drawing Sheets

(51) Int. Cl.
*H04W 76/10* (2018.01)
*H04W 12/106* (2021.01)
*H04W 8/08* (2009.01)

(58) Field of Classification Search
USPC .......................................................... 726/6
See application file for complete search history.

(56) References Cited

OTHER PUBLICATIONS

Anonymous: "3GPP TS 23.502 V0.5.0 3rd Generation Partnership Project; Technical Specification Group Services and System Aspects; Procedures for the 5G System; Stage 2 (Release 15)", 3GPP TS 23.502 V0.5.0. [Online] vol. TS. Jul. 1, 2017 (Jul. 1, 2017), pp. 1-148, XP055570478, Mobile Competence Centre; 650, route des Lucioles ; F-06921 Sophia-Antipolis Cedex ; France.
Extended European Search Report dated Jun. 11, 2021, issued in European Application No. 18854667.5-1218.
3GPP TS 33.501 v0.3.0, '3GPP; TSGSSA; Security Architecture and Procedures for 5G System (Release 15)', Aug. 21, 2017.
Ericsson, '5G SM-DN authentication of UE-update based on SA3 input', C1-172801, 3GPP TSG-CT WG1 Meeting #105, Krakow, Poland, Aug. 14, 2017.
Sharp, 'Pseudo-CR on DN authorization', C1-173579, 3GPP TSG-CT WG1 Meeting #105, Krakow, Poland, Aug. 25, 2017.
Qualcomm Incorporated, 'Identifying a problem with secondary authentication', S3-172008, 3GPP TSG SA WG3 (Security) Meeting #88, Dali, China, Jul. 31, 2017.
Anonymous: "3GPP TS 23.501 V1.0.0 3rd Generation Partnership Project; Technical Specification Group Services and System Aspects; System Architecture for the 5G System; Stage 2 (Release 15)", 3GPP TS 23.501 V1.0.0, 3rd Generation Partnership Project (3GPP), Mobile Competence Centre; 650, Route Des Lucioles ; F-06921 Sophia-Antipolis Cedex; France, vol. 3GPP TS 23.501, No. V1.0.0 Jun. 1, 2017 (Jun. 1, 2017), pp. 1-146, XP009517908.
Korean Notice of Allowance dated Oct. 20, 2022, issued in Korean Application No. 10-2017-0113657.
European Search Report dated Jan. 2, 2023, issued in European Application No. 18 854 667.5.

* cited by examiner

METHOD AND APPARATUS FOR AUTHENTICATING TERMINAL AND NETWORK IN 5G COMMUNICATION SYSTEM

TECHNICAL FIELD

The disclosure relates to an authentication method applied to a next-generation 5G communication system and an apparatus performing the authentication method, a network slice, a management method thereof, and an apparatus performing the management method.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

With the progress of 5G mobile communications, an access and mobility management function (AMF) that is a management entity managing mobility of a terminal and a session management function (SMF) that is an entity managing sessions have been separated from each other. Accordingly, in contrast with a management method in which a mobility management entity (MME) manages both terminal mobility and sessions in the existing 4G LTE communications, there is a need for schemes for an entity managing mobility of a terminal and an entity managing sessions of the terminal to authenticate the terminal, respectively, and then to perform communication with each other.

Solution to Problem

According to an embodiment of the disclosure, an authentication method by a terminal in a wireless communication system may include transmitting a first message for a session connection request to a session management function (SMF) via an access and mobility management function (AMF); and receiving a second message including authentication information from the SMF via the AMF in response to the session connection request.

According to an embodiment of the disclosure, a method by a session management function (SMF) for authenticating a terminal in a wireless communication system may include receiving a first message for a session connection request from the terminal via an access and mobility management function (AMF); and transmitting a second message including authentication information to the terminal via the AMF in response to the session connection request.

According to an embodiment of the disclosure, a terminal in a wireless communication system may include a transceiver configured to transmit and receive signals; and at least one processor configured to control to: transmit a first message for a session connection request to a session management function (SMF) via an access and mobility management function (AMF), and receive a second message including authentication information from the SMF via the AMF in response to the session connection request.

According to an embodiment of the disclosure, a session management function (SMF) in a wireless communication system may include a transceiver configured to transmit and receive signals; and at least one processor configured to control to: receive a first message for a session connection request from a terminal via an access and mobility management function (AMF), and transmit a second message including authentication information to the terminal via the AMF in response to the session connection request.

Advantageous Effects of Invention

According to an embodiment of the disclosure, in a 5G system in which a mobility management entity and a session management entity are separately provided, it is possible to perform security-guaranteed communications through providing of the schemes for authenticating the mobility management entity, the session management entity, and the terminal.

Further, according to an embodiment of the disclosure, in configuring a network slice, not only the service but also the performance of the slice can be considered, and thus a performance deterioration problem can be solved with the improvement of inefficiency in management.

Further, according to an embodiment of the disclosure, in configuring a network slice, if a conflict that may exert an influence on the performance occurs between network functions, it is possible to solve this, and the system and necessary resources can be efficiently managed.

MODE FOR THE INVENTION

Figure 1A:
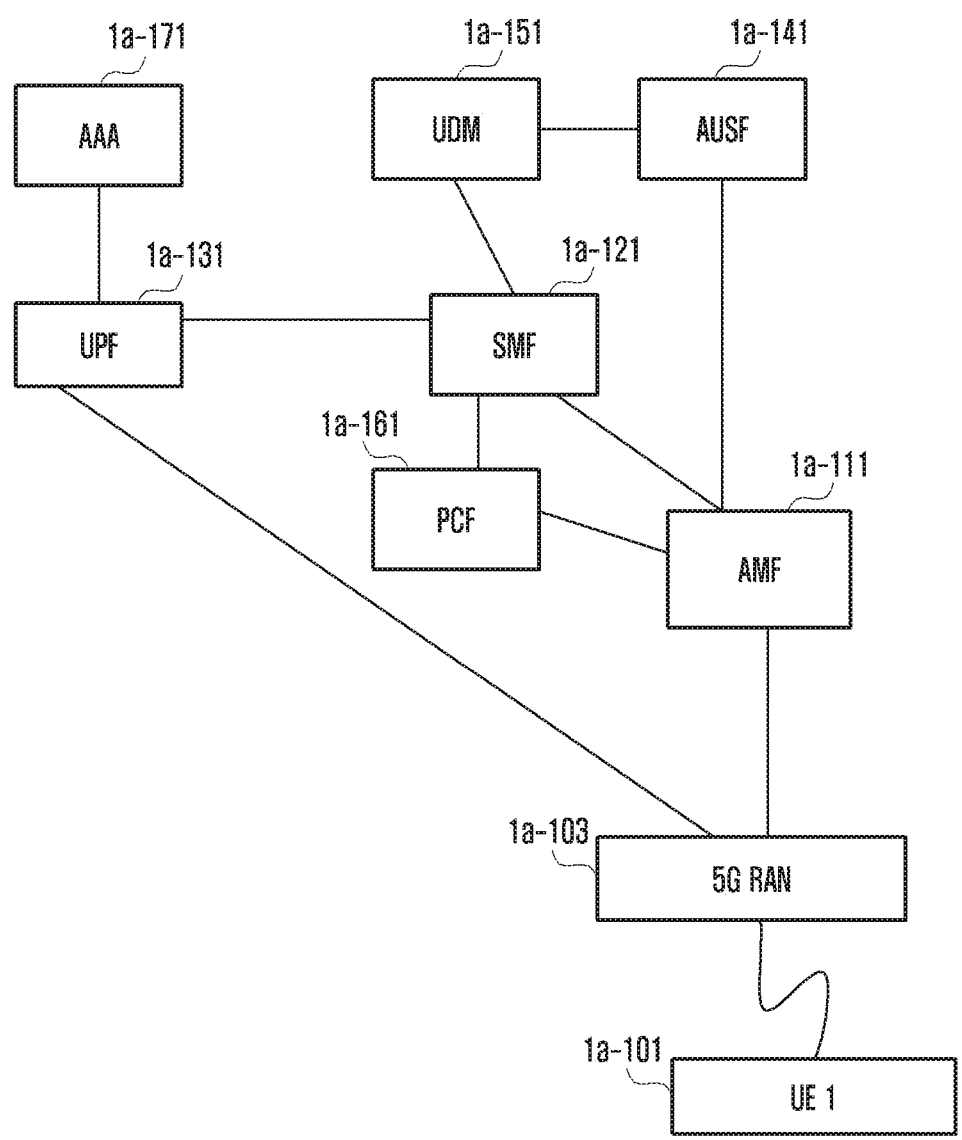
FIG. 1A is a diagram illustrating an example of a 5G system security network environment according to an embodiment of the disclosure.

In explaining embodiments of the disclosure, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "unit", as used in an embodiment, means, but is not limited to, a software or hardware component, such as FPGA or ASIC, which performs certain tasks. However, "unit" is not meant to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more CPUs in a device or a security multimedia card. Further, "unit" may include one or more processors.

First Embodiment

FIG. 1A is a diagram illustrating an example of a 5G system security network environment according to an embodiment of the disclosure.

In an embodiment of the disclosure, under the assumption of a 5G network, a 5G network system may include a user plane function (UPF) 1a-131, a session management function (SMF) 1a-121, an access and mobility management function (AMF) 1a-111, a 5G radio access network (RAN) 1a-103, a user data management (UDM) 1a-151, a policy control function (PCF) 1a-161, and so on. In order to authenticate these entities, an authentication server function (AUSF) 1a-141 and an authentication, authorization, and accounting (AAA) 1a-171 may also be included in the 5G network system. A terminal (UE1) 1a-101 may be connected to a network to perform 5G communication with the 5G RAN.

Although it is assumed that a communication network on the basis of the disclosure is a 5G network, it can be applied if the same concept is applied event to other systems within the category that can be understood by those of ordinary skill in the art.

Figure 1B:
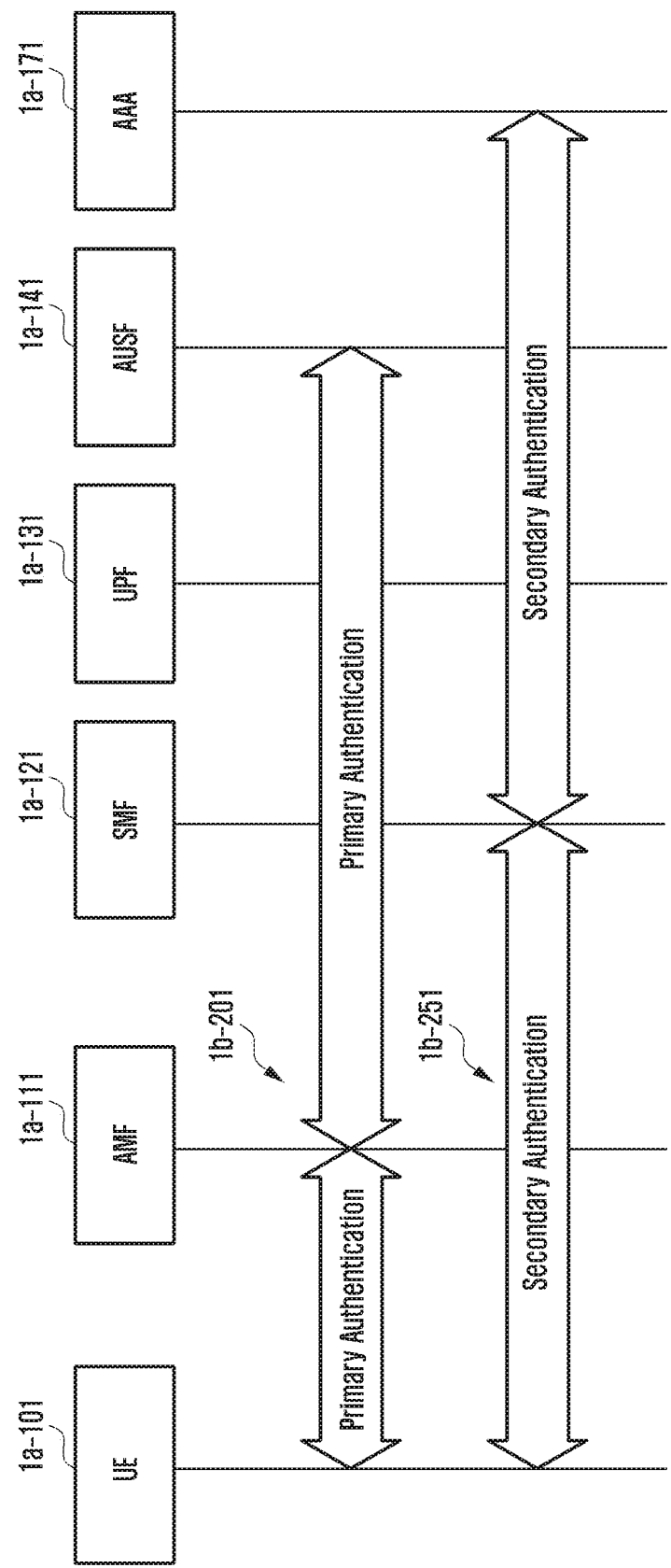
FIG. 1B is a diagram illustrating an example of a security authentication operation of a terminal in a 5G system according to an embodiment of the disclosure.

FIG. 1B is a diagram illustrating an example of a security authentication operation of a terminal in a 5G system according to an embodiment of the disclosure.

Operation 1b-201 represents an extensible authentication protocol method for UMTS authentication and key agreement (EAP-AKA) authentication process via a terminal (UE) 1a, an AMF 1a-111, and an AUSF 1a-141. Such an authentication is an authentication process for mobility, and it may be a primary authentication process.

Operation 1b-251 represents an authentication process for a session management via the terminal 1a-101, an SMF 1a-121, and an AAA server 1a-171 that may be in an external network. In this process, the SMF takes part in the authentication process as an anchor for the authentication, and this process is called a secondary authentication. In this process, messages are exchanged among UE-AMF-SMF, and the details of this process will be exemplarily described in the following embodiments.

Figure 1C:
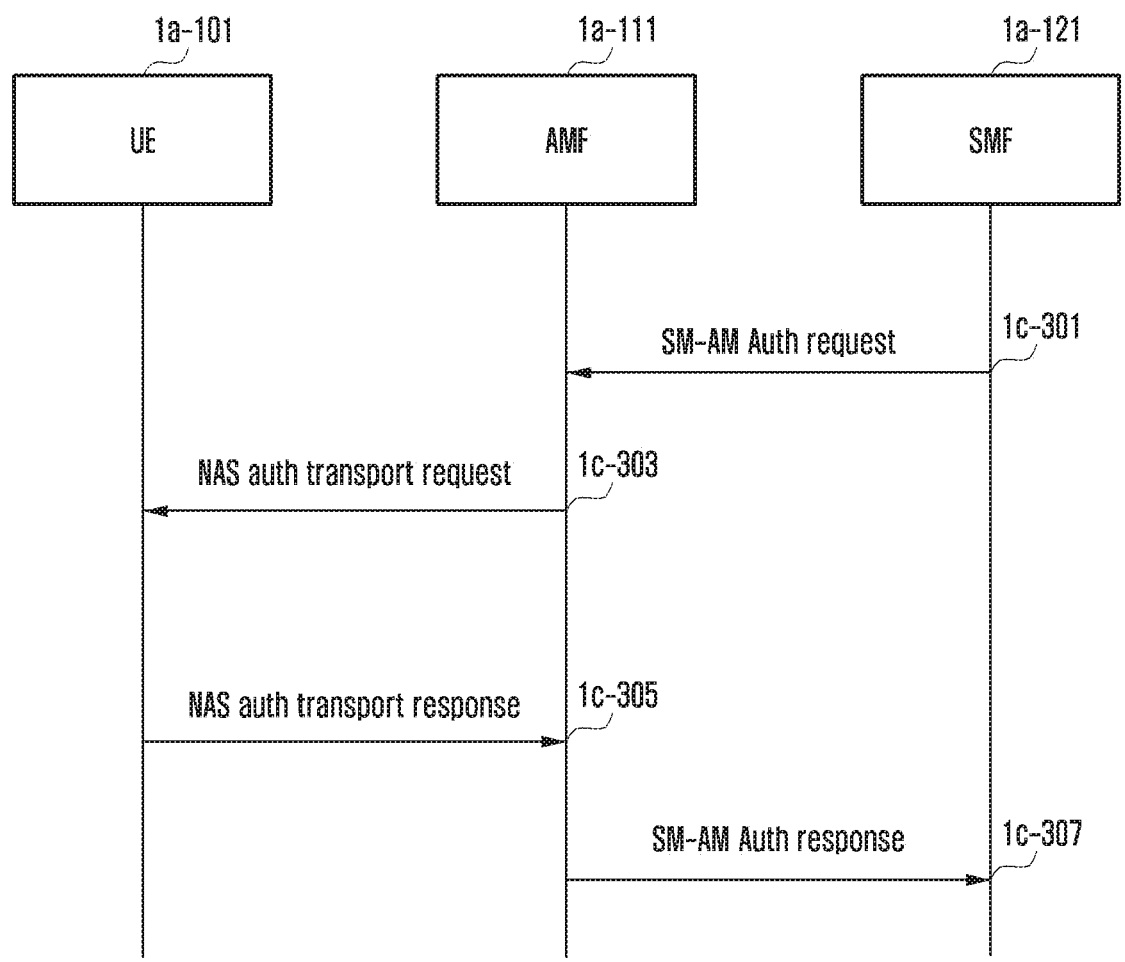
FIG. 1C is a diagram illustrating a security authentication message procedure according to an embodiment of the disclosure.

FIG. 1C is a diagram illustrating a security authentication message procedure according to an embodiment of the disclosure.

At operation 1c-301, an SM-AM authentication request message is transmitted from the SMF to the AMF. In an embodiment, the SM-AM authentication request message may include an EAP-request.

At operation 1c-303, a NAS auth transport request message for requesting the authentication is transmitted from the SMF to the UE via the AMF as a message being transferred from the AMF to the UE. In an embodiment, the message type may be configured as in Table 1 below.

TABLE 1

| IEI | Information Element | Type/Reference | Presence | Format | Length |
| --- | --- | --- | --- | --- | --- |
|  | Extended Protocol Discriminator | Extended Protocol Discriminator | M | V | 1 |
|  | Security Header type | Security Header type | M | V | ½ |
|  | Spare half octet | Spare half octet | M | V | ½ |
|  | Procedure Transaction Identity | Procedure Transaction Identity | M | V | 1 |
|  | NAS auth transport requestMessage identity | Message type | M | V | 1 |
|  | Auth message container type | Auth message container type | M | V | 1 |
|  | Auth message container | Auth message container | M | LV-E | 3-n |

As the message being transferred from the AMF to the UE at operation 1c-303, the NAS auth transport request message for requesting the authentication that is transmitted from the SMF to the UE via the AMF may be configured as in Table 2 below as another embodiment.

TABLE 2

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | ½ |
| | Spare half octet | Spare half octet | M | V | ½ |
| | Procedure Transaction Identity | Procedure Transaction Identity | M | V | 1 |
| | NAS auth transport requestMessage identity | Message type | M | V | 1 |
| | Auth message container | Auth message container | M | LV | 3-n |

At operation 1c-305, in order to send an authentication response for responding to the authentication request from the UE to the SMF via the AMF, the UE send a NAS auth transport response message to the AMF. In an embodiment, the message type may be configured as in Table 3 below.

TABLE 3

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | ½ |
| | Spare half octet | Spare half octet | M | V | ½ |
| | Procedure Transaction Identity | Procedure Transaction Identity | M | V | 1 |
| | NAS auth transport responseMessage identity | Message type | M | V | 1 |
| | Auth message container type | Auth message container type | M | V | 1 |
| | Auth message container | Auth message container | M | LV-E | 3-n |

At operation 1c-305, the NAS auth transport response message for responding to the authentication request, which the UE sends to the SMF via the AMF, may be configured as in Table 4 below as another embodiment.

TABLE 4

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | ½ |
| | Spare half octet | Spare half octet | M | V | ½ |
| | Procedure Transaction Identity | Procedure Transaction Identity | M | V | 1 |
| | NAS auth transport responseMessage identity | Message type | M | V | 1 |
| | Auth message container | Auth message container | M | LV-E | 3-n |

At operation 1c-307, the response to the authentication that is transferred from the UE is transferred from the AMF to the SMF via an SM-AM authentication response message.

The auth message container, that is, the authentication message container, being used in the above-described process may be configured as in Table 5 below.

TABLE 5

| 8 | 7 | 6 | 5 | 4 | 3 | 2 | 1 |
|---|---|---|---|---|---|---|---|
| Auth message container IEI | | | | | | | |
| Length of auth message container contents | | | | | | | |
| Auth message container contents | | | | | | | |

Figure 1D:
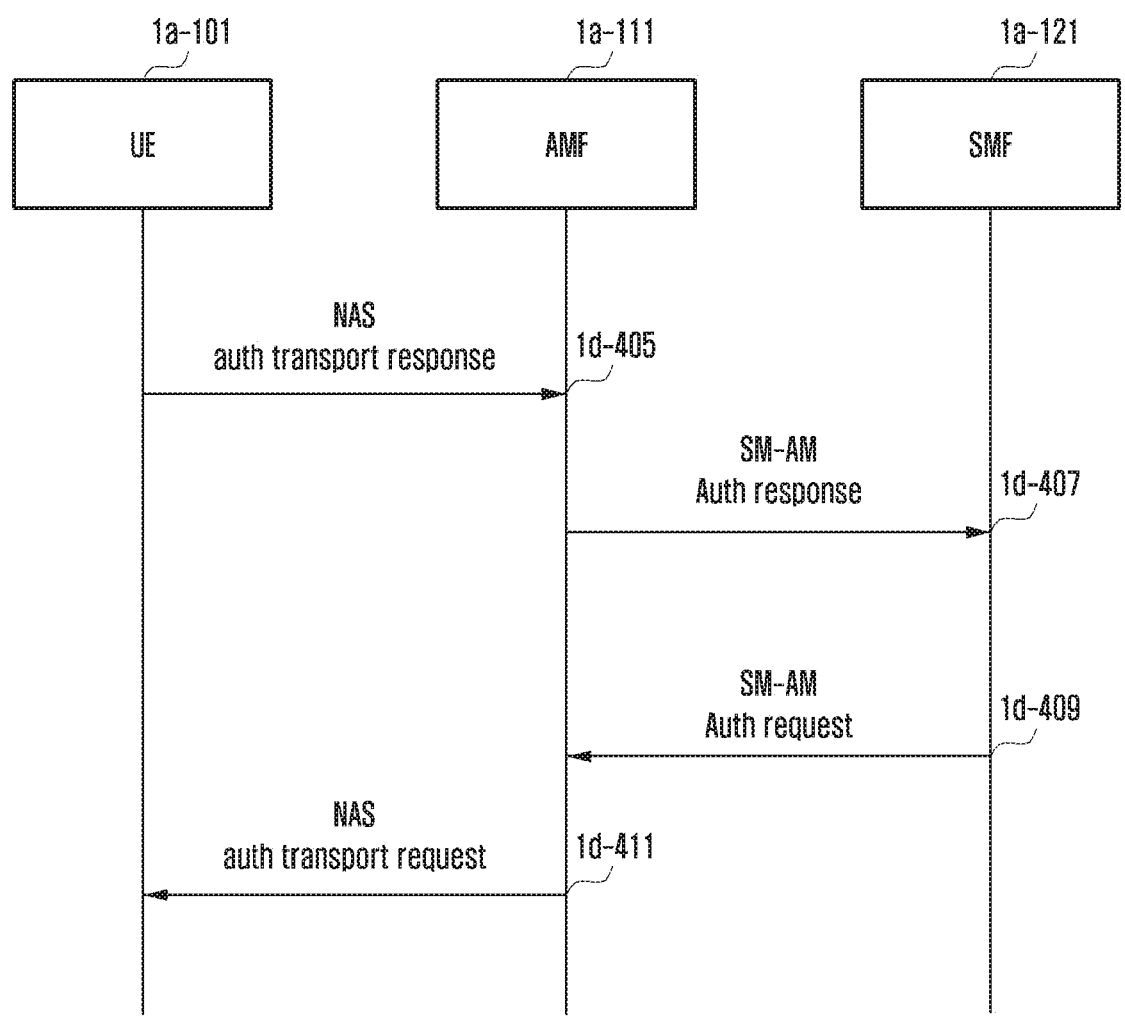
FIG. 1D is a diagram illustrating a security authentication message procedure according to another embodiment of the disclosure.

FIG. 1D is a diagram illustrating a security authentication message procedure according to another embodiment of the disclosure.

At operation 1d-405, the UE sends a NAS SM request message for PDU session establishment to the SMF via the AMF. Such a NAS SM request message may include an EAP response message for security authentication, or it may be transmitted together with the EAP response message.

At operation 1d-407, the AMF sends an SM request message to the SMF.

At operation 1d-409, the SMF sends an SM request ack message to the AMF.

At operation 1d-411, the AMF sends a NAS SM request ack message to the UE. Such a (NAS) SM request ack message that is transmitted from the SMF to the UE via the AMF may include an EAP success message for the security authentication, or it may be transmitted together with the EAP success message. As an embodiment, the NAS SM request ack message may include the auth message container or the like as presented in Table 5.

Second Embodiment

Figure 2A:
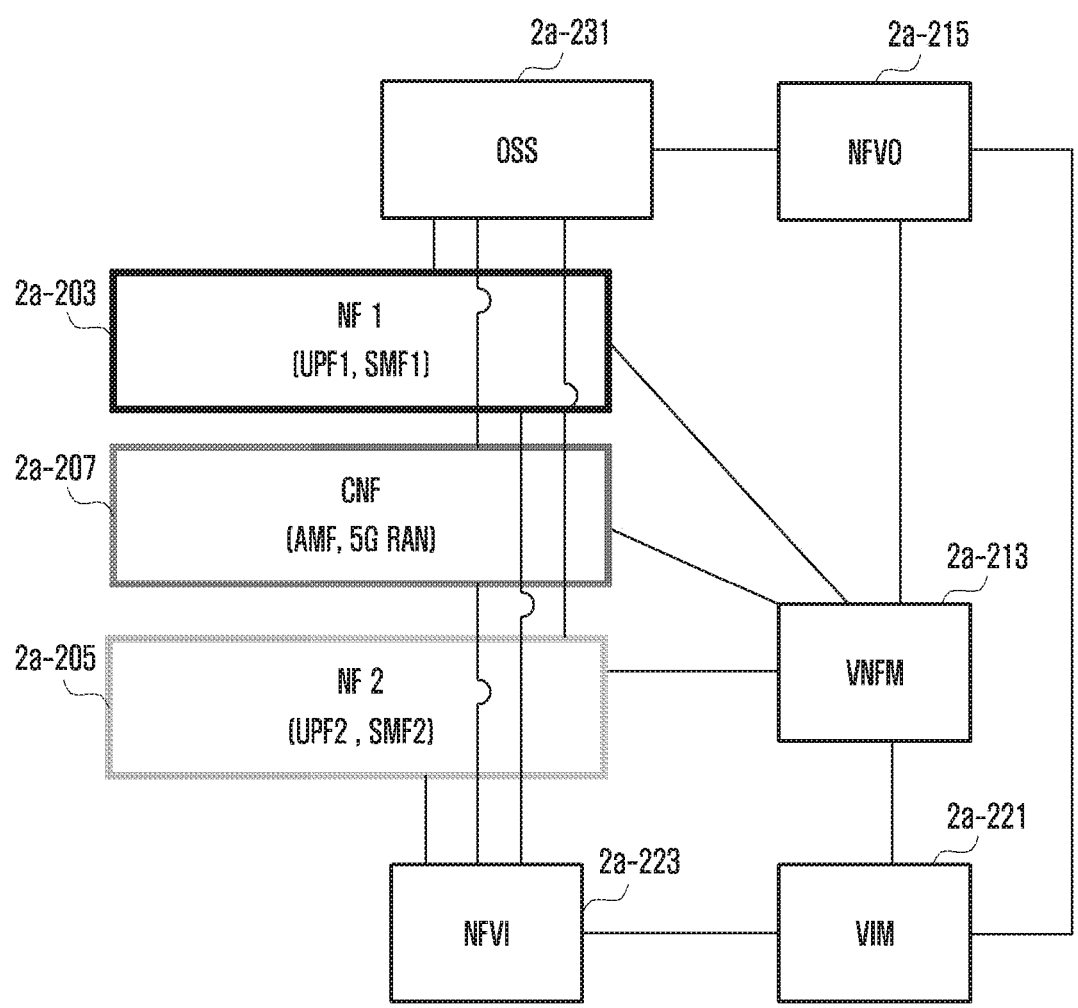
FIG. 2A is a diagram illustrating an example of a 5G system management environment according to an embodiment of the disclosure.

FIG. 2A is a diagram illustrating an example of a 5G system management environment according to an embodiment of the disclosure.

With reference to FIG. 2A, a 5G system may be composed of a network functions virtualization orchestrator (NFVO) 2a-215, a virtualized network function manager (VNFM) 2a-213, a virtualized infrastructure management (VIM) 2a-221, a network function virtualization infrastructure (NFVI) 2a-223, and an operation support system (OSS) 2a-231.

Further, a network function (NF) may be composed of a virtual network function (VNF), a physical network function (PNF), and the like, and in an embodiment of the disclosure, the NF is described as network function 1 (NF1) 2a-203, NF 2 2a-205, and a common network function (CNF) 2a-207. The common network function has been described as the concept of commonly called ones having common functions in the network function.

Figure 2B:
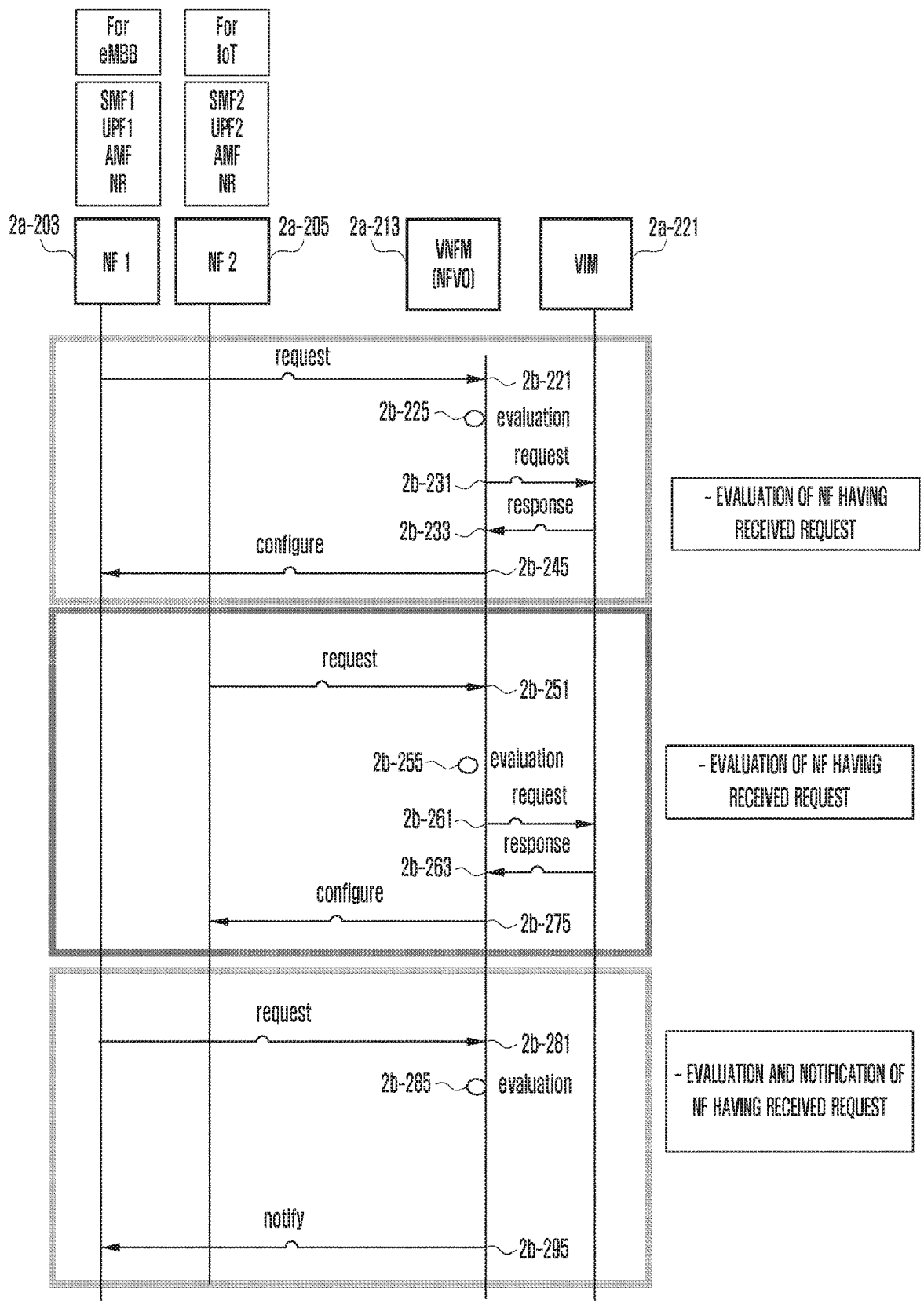
FIG. 2B is a diagram illustrating a signal overhead according to an embodiment of a resource management in the related art.
Figure 2C:
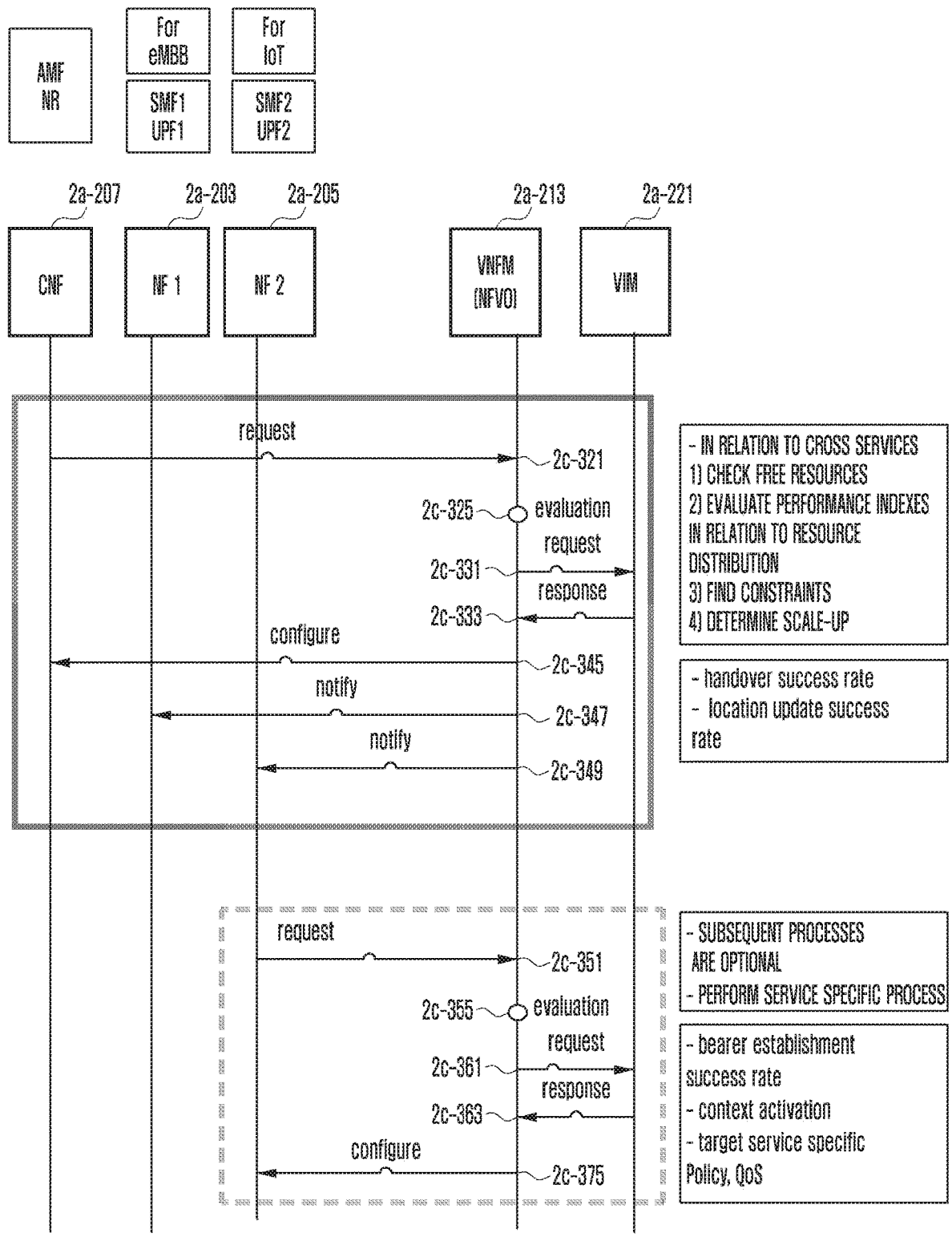
FIG. 2C is a diagram illustrating an example of a signal efficiency of a resource management according to an embodiment of the disclosure.
Figure 2D:
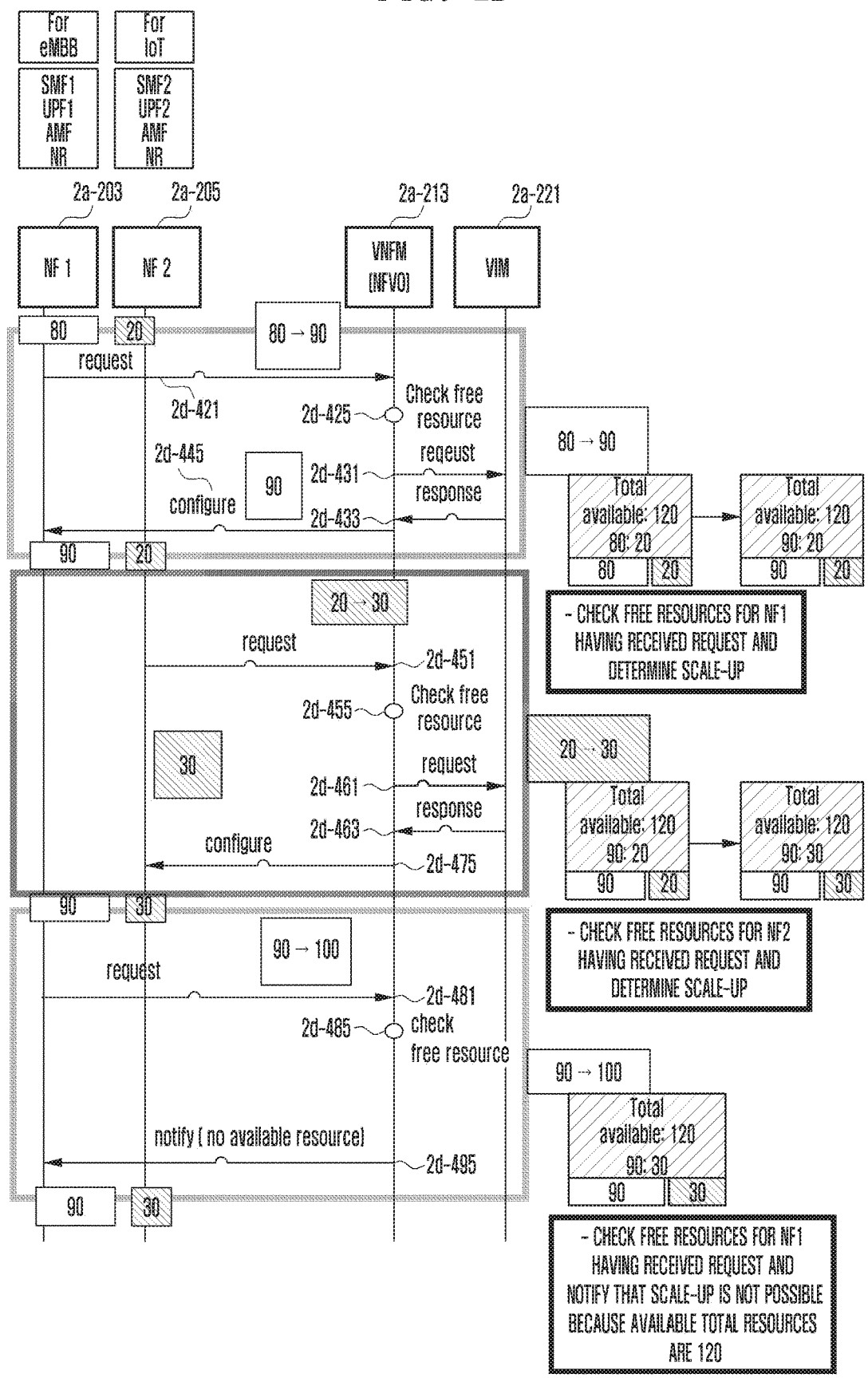
FIG. 2D is a diagram illustrating an embodiment of a resource management in the related art.
Figure 2E:
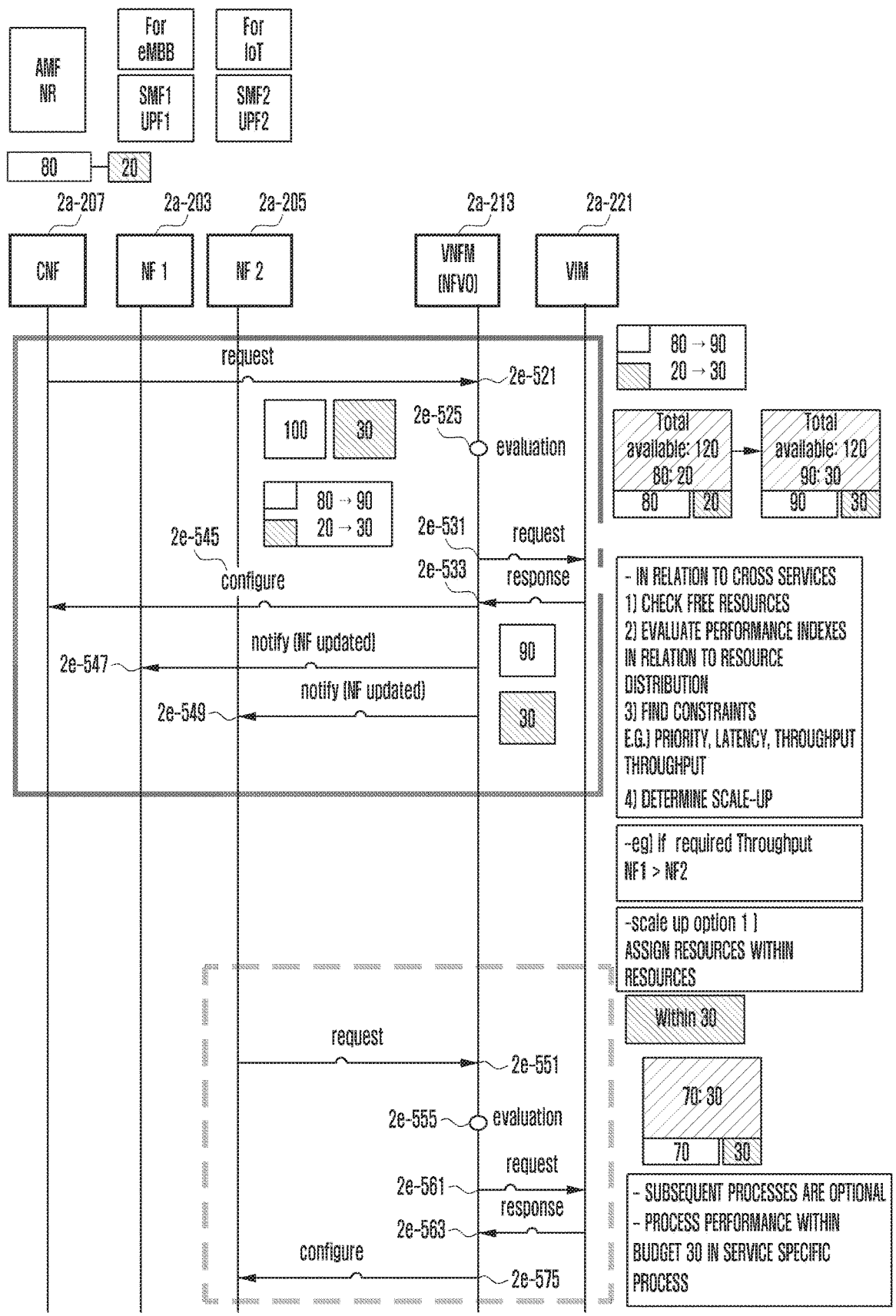
FIG. 2E is a diagram illustrating an example (embodiment 2-1) of a resource management according to an embodiment of the disclosure.
Figure 2F:
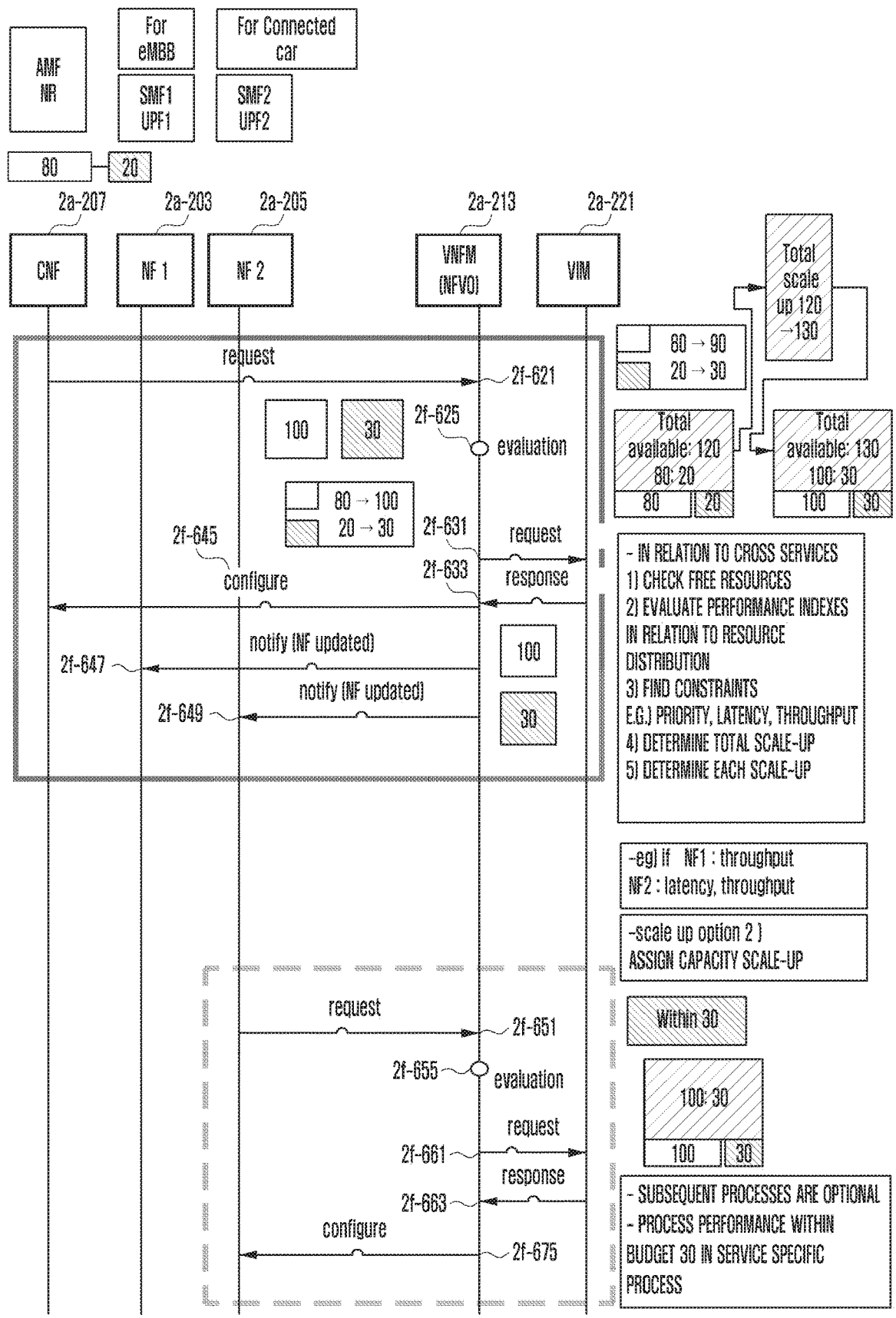
FIG. 2F is a diagram illustrating an example (embodiment 2-2) of a resource management according to another embodiment of the disclosure.
Figure 2G:
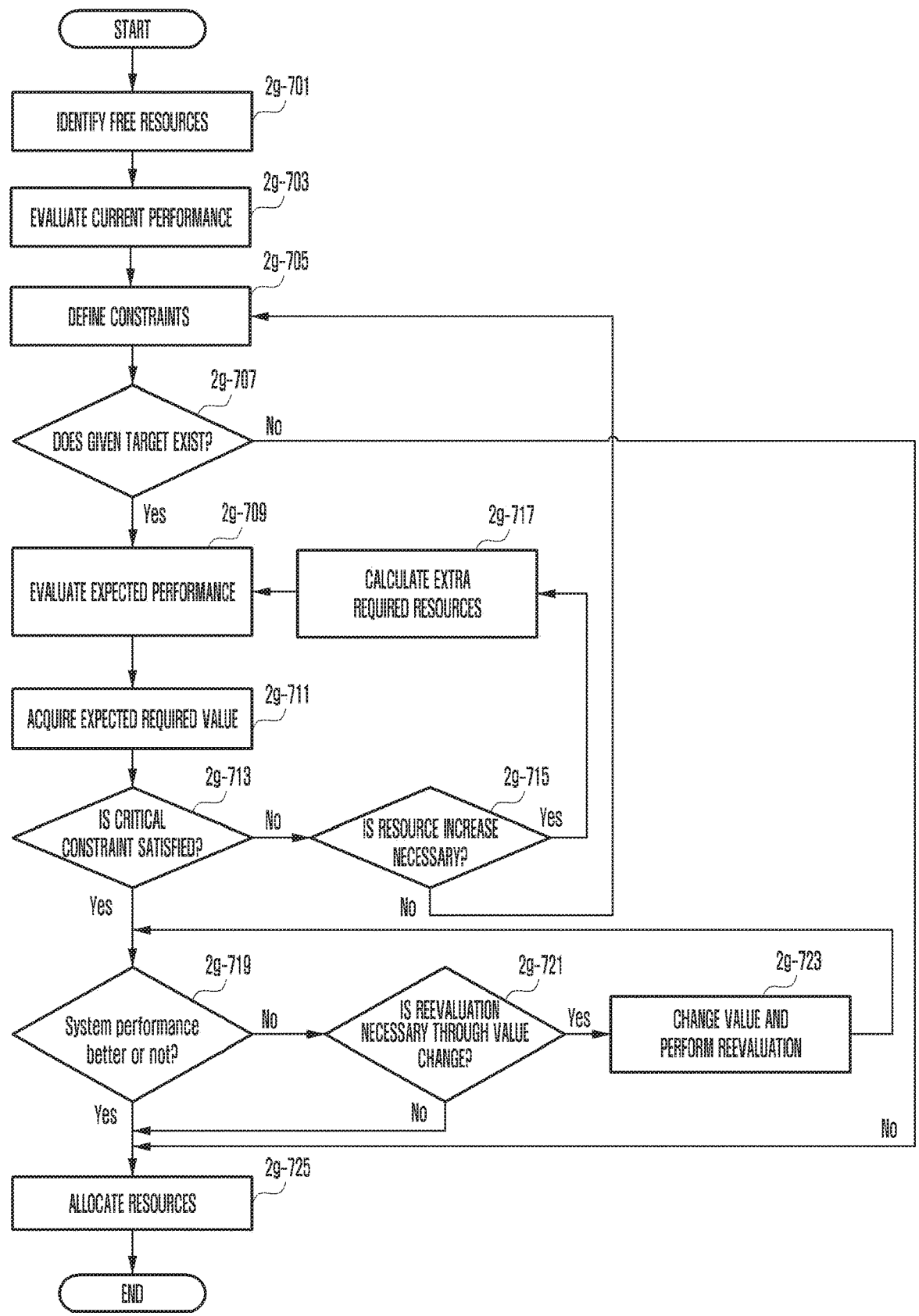
FIG. 2G is a diagram illustrating an example of a resource management flowchart according to an embodiment of the disclosure.
Figure 2H:
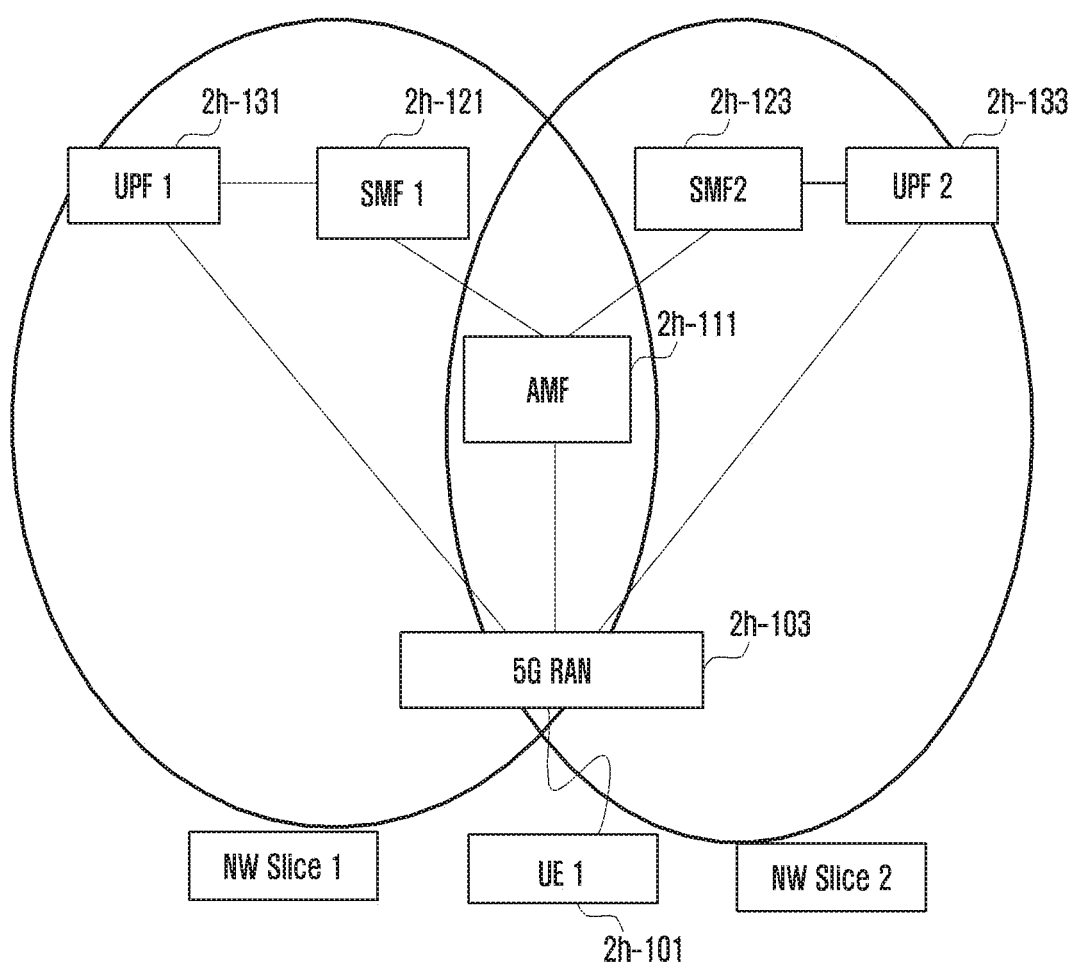
FIG. 2H is a diagram illustrating an example of a network system environment according to an embodiment of the disclosure.

FIG. 2A discloses entities managing a system entity of FIG. 2H according to an embodiment of the disclosure. For example, it may be assumed that NF1 2a-203, which is for eMBB, is composed of an entity managing SMF1 and UPF1, and NF2 2a-205 is composed of an entity managing SMF2 and UPF2. Meanwhile, it may be assumed that the common network function (CNF) 2a-207 is composed of an entity managing the AMF and 5G RAN.

Although it is assumed that a communication network on the basis of the disclosure is a 5G network, it can be applied if the same concept is applied event to other systems within the category that can be understood by those of ordinary skill in the art. Meanwhile, it is assumed that the disclosure has an environment in which a virtualized network is used in the 5G system. In the case of the virtualized network function, it includes the function so called the virtualized network function management for managing the virtualized network function and the NFVO for controlling the function as a whole, and it takes part in the orchestration, that is, the overall control. Resources of such entities are virtually gathered and commonly called the network functions virtualization infrastructure (NFVI). Further, such resources are managed by the virtualized infrastructure manager (VIM).

FIG. 2B is a diagram illustrating a signal overhead according to an embodiment of a resource management in the related art.

For example, it may be assumed that NF1 2a-203, which is for eMBB, is composed of an entity managing SMF1, UPF1, AMF, and 5G RAN, and NF2 2a-205 is composed of an entity managing SMF2, UPF2, AMF, and 5G RAN.

At operation 2b-221, the NF1 transmits a request message for requesting resources to the VNFM 2a-213. At operation 2b-225, the VNFM evaluates a resource usage status for the NF having received the request, and it notifies the NFVO of the resource usage status of the NF1. Further, the VNFM or NFVO evaluates the resource usage status for the NF having received the request. In this case, the VNFM or NFVO checks whether there are free resources that can be allocated. At operation 2b-231, the VNFM or NFVO requests necessary resources for the NF1 from the VIM 2a-221. At operation 2b-233, the VIM sends a response message for allocating the necessary resources for the NF1 to the VNFM or NFVO. At operation 2b-245, the VNFM configures the NF1 by allocating the resources to the NF1.

At operation 2b-251, the NF2 transmits a request message for requesting resources to the VNFM. At operation 2b-255, the VNFM evaluates a resource usage status for the NF having received the request, and it notifies the NFVO of the resource usage status of the NF2. Further, the VNFM or NFVO evaluates the resource usage status for the NF having received the request. In this case, the VNFM or NFVO checks whether there are free resources that can be allocated. At operation 2b-261, the VNFM or NFVO requests necessary resources for the NF2 from the VIM. At operation 2b-263, the VIM sends a response message for allocating the necessary resources for the NF2 to the VNFM or NFVO. At operation 2b-275, the VNFM configures the NF2 by allocating the resources to the NF2.

Meanwhile, at operation 2b-281, the NF1 transmits a request message for requesting resources to the VNFM. At operation 2b-285, the VNFM evaluates a resource usage status for the NF having received the request, and it notifies the NFVO of the resource usage status of the NF1. Further, the VNFM or NFVO evaluates the resource usage status for the NF having received the request. In this case, the VNFM or NFVO checks whether there are free resources that can be allocated. If there are not available free resources, the VNFM, at operation 2b-295, notifies the NF1 of the non-existence of the resources that can be allocated to the NF1.

In the related art as shown in FIG. 2B, a resource allocation is performed, for example, through 13 steps to cause a signal overhead, and even in the resource allocation, the NF1 may not be allocated with the resources requested later.

FIG. 2C is a diagram illustrating an example of a signal efficiency of a resource management according to an embodiment of the disclosure.

For example, it may be assumed that NF1 2a-203, which is for eMBB, is composed of an entity managing SMF1 and UPF1, and NF2 2a-205 is composed of an entity managing SMF2 and UPF2. Meanwhile, it may be assumed that the common network function (CNF) 2a-207 is composed of an entity managing the AMF and 5G RAN.

At operation 2c-321, the CNF transmits a request message for requesting resources to the VNFM 2a-213. At operation 2c-325, the VNFM evaluates a resource usage status for the NF having received the request, and it notifies the NFVO of the resource usage status of the CNF. Further, the VNFM or NFVO evaluates the resource usage status for the CNF having received the request. In this case, the VNFM or NFVO checks whether there are free resources that can be allocated.

At operation 2c-325 composed of an entity operation commonly related to a slice, it is possible 1) to check the free resources through evaluation of the resources, 2) to evaluate a performance index in relation to resource distribution, 3) to find constraints exerting an influence on the performance accordingly, and 4) to determine whether to increase or maintain the resources. In this case, a handover success rate or a location update success rate (e.g., tracking area update success rate or the like) may be used as the performance index.

At operation 2c-331, the VNFM or NFVO requests resources necessary for the CNF to the VIM 2a-221. At operation 2c-333, the VIM sends a response message for allocating the resources necessary for the CNF to the VNFM or NFVO.

At operation 2c-345, the VNFM or NFVO configures the CNF by allocating the resources to the CNF. At operations 2c-347 and 2c-349 together with the operation 2c-345, the VNFM or NFVO notifies the NF1 and NF2 that resources have been allocated to the CNF. Through such notification, the performances of SMF1, UPF1, SMF2, and UPF2 using both the AMF and 5G RAN being managed by the CNF can be improved.

Operation 2c-351 and the subsequent operations are selective operations. That is, in the case of managing the entity that controls the IoT service, such as NF2, that is, SMF2 and UPF2, as a selective operation for processing a specific service-specific operation, an example of the operation being selectively performed will be described as follows.

At operation 2c-351, the NF2 transmits a request message for requesting the resources to the VNFM.

At operation 2c-355, the VNFM evaluates a resource usage status for the NF having received the request, and it notifies the NFVO of the resource usage status of the NF2. Further, the VNFM or NFVO evaluates the resource usage status for the NF having received the request. In this case, the VNFM or NFVO checks whether there are free resources that can be allocated. In addition to the checking of whether there are free resources that can be allocated, a bearer establishment success rate, a target service specific policy, or the QoS may be used as an evaluation reference.

At operation 2c-361, the VNFM or NFVO requests necessary resources for the NF2 from the VIM. At operation 2c-363, the VIM sends a response message for allocating the necessary resources for the NF2 to the VNFM or NFVO. At operation 2c-375, the VNFM configures the NF2 by allocating the resources to the NF2.

As shown in FIG. 2C, according to the technology of the disclosure, because the resource allocation is performed through minimally 5 steps, the overhead can be greatly reduced, and in the resource allocation, optimum allocation can be made even with respect to the resources requested by the NF1.

FIG. 2D is a diagram illustrating an embodiment of a resource management in the related art.

At operation 2d-421, NF1 2a-203 transmits a request message for requesting resources to the VNFM 2a-213.

In this case, it is assumed that the resources allocated to the NF1 are 80, the resources allocated to the NF2 2a-205 are 20, and the total available resources that can be allocated for the NF1 and NF2 are 120. At operation 2d-421, the NF1 requests the VNFM or the NFVO to increase the resources from 80 to 90.

At operation 2d-425, the VNFM evaluates a resource usage status for the NF having received the request, and it notifies the NFVO of the resource usage status of the NF1. Further, the VNFM or NFVO evaluates the resource usage status for the NF having received the request. In this case, the VNFM or NFVO checks whether there are free resources that can be allocated.

Because the resources being currently allocated to the NF1 are 80, the resources being currently allocated to the NF2 are 20, and the total available resources are 120, the NF1 can scale up the resources.

At operation 2d-431, the VNFM or NFVO requests necessary resources for the NF1 from the VIM 2a-221. At operation 2d-433, the VIM sends a response message for allocating the necessary resources for the NF1 to the VNFM or NFVO. At operation 2d-445, the VNFM configures the NF1 by allocating the resources to the NF1. Because the resources being currently allocated to the NF1 and the NF2 are 80 and 20, respectively, the resources requested for the NF1 are 90, and only the resources of 100 among the total available resources of 120 have been allocated, the NF1 can scale up the resources. Accordingly, it is possible to configure the NF1 by scaling up the resources allocated to the NF1 from 80 to 90.

At operation 2d-451, the NF2 transmits a request message for requesting the resources to the VNFM.

In this case, it is assumed that the resources allocated to the NF1 have been changed to 90, the resources allocated to the NF2 are 20, and the total available resources that can be allocated for the NF1 and the NF2 are 120. At operation 2d-451, the NF2 requests the VNFM or NFVO to increase the resources from 20 to 30.

At operation 2d-455, the VNFM evaluates the resource usage status for the NF having received the request, and it notifies the NFVO of the resource usage status of the NF2. Further, the VNFM or NFVO evaluates the resource usage status for the NF having received the request. In this case, the VNFM or NFVO checks whether there are free resources that can be allocated.

Because the resources being currently allocated to the NF1 and the NF2 are 90 and 20, respectively, and the total available resources are 120, the NF2 can scale up the resources.

At operation 2d-461, the VNFM or NFVO requests necessary resources for the NF2 from the VIM. At operation 2d-463, the VIM sends a response message for allocating the necessary resources for the NF2 to the VNFM or NFVO. At operation 2d-475, the VNFM configures the NF2 by allocating the resources to the NF2. Because the resources being currently allocated to the NF1 and the NF2 are 90 and 20, respectively, the resources requested for the NF2 are 30, and only the resources of 110 among the total available resources of 120 have been allocated, the NF2 can scale up the resources. Accordingly, it is possible to configure the NF2 by scaling up the resources allocated to the NF2 from 20 to 30.

Meanwhile, at operation 2d-481, the NF1 transmits a request message for requesting resources to the VNFM.

At operations 2d-445 and 2d-475 as described above, it is assumed that the resources allocated to the NF1 are 90, the resources allocated to the NF2 are 30, and the total available resources that can be allocated for the NF1 and the NF2 are 120. At operation 2d-481, the NF1 requests the VNFM or NFVO to increase the resources from 90 to 100.

At operation 2d-485, the VNFM evaluates the resource usage status for the NF having received the request, and it notifies the NFVO of the resource usage status of the NF1. Further, the VNFM or NFVO evaluates the resource usage status for the NF having received the request. In this case, the VNFM or NFVO checks whether there are free resources that can be allocated.

Because the resources being currently allocated to the NF1 and the NF2 are 90 and 30, respectively, and the total available resources are 120, the NF1 is unable to scale up the resources.

If there are not the available free resources, the VNFM, at operation 2d-495, notifies the NF1 of the nonexistence of the resources that can be allocated to the NF1.

As can be seen from FIG. 2D, according to the technology in the related art, even in the resource allocation, the NF1 may be unable to be allocated with the requested resources later.

FIG. 2E is a diagram illustrating an example (embodiment 2-1) of a resource management according to an embodiment of the disclosure.

An embodiment of FIG. 2E corresponds to a case where resources are allocated within the possible total available resources.

For example, NF1 2a-203, which is for eMBB, may be composed of an entity managing SMF1 and UPF1, and NF2 2a-205 may be composed of an entity managing SMF2 and UPF2. Meanwhile, the common network function (CNF) 2a-207 may be composed of an entity managing the AMF and 5G RAN.

At operation 2e-521, the CNF transmits a request message for requesting resources to the VNFM 2a-213.

In this case, it is assumed that the resources allocated to slice 1, that is, an eMBB service, are 80, the resources allocated to slice 2, that is, IoT, are 20, and the total available resources that can be allocated for the NF1 and the NF2 are 120. At operation 2e-521, the VNFM or NFVO is requested to increase the resources for the service of slice 1 from 80 to 100 and to increase the resources for the service of slice 2 from 20 to 30.

At operation 2e-525, the VNFM evaluates a resource usage status for the NF having received the request, and it notifies the NFVO of the resource usage status of the CNF. Further, the VNFM or NFVO evaluates the resource usage status for the CNF having received the request. In this case, the VNFM or NFVO checks whether there are free resources that can be allocated.

At operation 2e-525 composed of an entity operation commonly related to a slice, it is possible to evaluate the performance index in relation to resource distribution in addition to checking of the free resources through evaluation of the resources. Accordingly, it is possible to find constraints exerting an influence on the performance and to determine whether to increase or maintain the resources. In this case, a handover success rate or a location update success rate (e.g., tracking area update success rate or the like) may be used as the performance index.

For example, the constraints in relation to the performance index conditions may be service priority, latency, and throughput, and it is assumed that the throughput for slice 1 should be better than that of slice 2, and resources should be allocated within the available resources.

In this case, the resources being currently allocated to the CNF for slice 1 for the eMBB service are 80, the resources for slice 2 for the IoT service are 20, and the total available resources are 120. In this case, although the CNF has requested to scale up the resources for slice 1 from 80 to 100 and to scale up the resources for slice 2 from 20 to 30, it is possible to scale up the resources for slice 1 from 80 to 90 within the available resource range rather than 100 originally requested, and to scale up the resources for slice 2 from 20 to 30 as the result of the evaluation.

At operation 2e-531, the VNFM or NFVO requests necessary resources for the CNF from the VIM 2a-221. At operation 2e-533, the VIM sends a response message for allocating the necessary resources for the CNF to the VNFM or NFVO. At operation 2e-545, the VNFM or NFVO configures the CNF by allocating the resources to the CNF. At operations 2e-547 and 2e-549 together with operation 2e-545, through the notification by the VNFM or NFVO, the performances of SMF1, UPF1, SMF2, and UPF2 using both the AMF and 5G RAN being managed by the CNF can be improved. That is, according to an embodiment, the resources being currently allocated to the CNF for slice 1 and slice 2 are 80 and 20, respectively, the resources requested for slice 1 and slice 2 are 100 and 20, respectively, and only the resources of 100 are allocated among the total available resources of 120. In this case, an optimal resource allocation condition is searched for and allocated to match the performance indexes and constraints for allocation of the resources of 90 and 30 for slice 1 and slice 2, respectively.

That is, the CNF is configured by scaling up the resources allocated through optimal schemes within the available resource range.

Operation 2e-551 and the subsequent operations are selective operations. That is, in the case of managing the entity that controls the IoT service, such as NF2, that is, SMF2 and UPF2, as a selective operation for processing a specific service-specific operation, an example of the operation being selectively performed will be described as follows.

According to an embodiment, the resources are allocated for detailed services in consideration of the performance in a state where among the total resources of 120, the resources of 90 are allocated for slice 1 and the resources of 30 are allocated for slice 2. At operation 2e-551, the NF2 transmits a request message for requesting the resources to the VNFM.

At operation 2e-555, the VNFM evaluates the resource usage status for the NF having received the request, and it notifies the NFVO of the resource usage status of the NF2. Further, the VNFM or NFVO evaluates the resource usage status for the NF having received the request. In this case, the VNFM or NFVO checks whether there are free resources that can be allocated.

Meanwhile, in addition to the checking of whether there are free resources that can be allocated, a bearer establishment success rate, a target service specific policy, or the QoS may be used as an evaluation reference.

At operation 2e-561, the VNFM or NFVO requests necessary resources for the NF2 from the VIM. At operation 2e-563, the VIM sends a response message for allocating the necessary resources for the NF2 to the VNFM or NFVO.

At operation 2e-575, the VNFM configures the NF2 by allocating the resources to the NF2. As shown in FIG. 2E, according to the technology of the disclosure, even in the resource allocation, the resource management is performed together with the entities commonly applied to the slices, and thus the optimal resource allocation can be performed with respect to the resource requests by slice 1 and slice 2 through not only the free resources but also evaluation of the resource usage or the performance index.

FIG. 2F is a diagram illustrating an example (embodiment 2-2) of a resource management according to another embodiment of the disclosure.

An embodiment of FIG. 2F corresponds to a case where resources are allocated through scale-up of the total resources in addition to the possible total resources. Such scale-up of the resources enables entities to be virtually configured and it enables the resources to be allocated.

For example, it is assumed that NF1 2a-203, which is for eMBB, is composed of an entity managing SMF1 and UPF1, and NF2 2a-205 is composed of an entity managing SMF2 and UPF2. Meanwhile, it may be assumed that the common network function (CNF) 2a-207 is composed of an entity managing the AMF and 5G RAN.

At operation 2f-621, the CNF transmits a request message for requesting resources to the VNFM 2a-213.

In this case, it is assumed that the resources allocated to slice 1, that is, an eMBB service, are 80, the resources allocated to slice 2, that is, IoT, are 20, and the total available resources that can be allocated for the NF1 and the NF2 are 120. At operation 2f-621, the VNFM or NFVO is requested to increase the resources for the service of slice 1 from 80 to 100 and to increase the resources for the service of slice 2 from 20 to 30.

At operation 2f-625, the VNFM evaluates a resource usage status for the NF having received the request, and it notifies the NFVO of the resource usage status of the CNF. Further, the VNFM or NFVO evaluates the resource usage status for the CNF having received the request. In this case, the VNFM or NFVO checks whether there are free resources that can be allocated.

At operation 2f-625 composed of an entity operation commonly related to a slice, it is possible to evaluate the performance index in relation to resource distribution in addition to checking of the free resources through evaluation of the resources, and thus it is possible to find constraints exerting an influence on the performance and to determine whether to increase or maintain the resources. In this case, a handover success rate or a location update success rate (e.g., tracking area update success rate or the like) may be used as the performance index.

For example, the constraints in relation to the performance index conditions may be service priority, latency, and throughput, and it is assumed that the throughput for slice 1 and the latency and the throughput for slice 2 are important constraints, and thus the resources should be allocated through additional scale-up of the resources in addition to the available resources.

In this case, the resources being currently allocated to the CNF for slice 1 for the eMBB service are 80, the resources for slice 2 for the IoT service are 20, and the total available resources are 120. In this case, although the CNF has requested to scale up the resources for slice 1 from 80 to 100 and to scale up the resources for slice 2 from 20 to 30, it is also possible to scale up the total resource capacity from 100 to 130, to scale up the resources for slice 1 from 80 to 100, and to scale up the resources for slice 2 from 20 to 30 in consideration of the resource scale-up for both slice 1 and slice 2 as the result of the evaluation.

At operation 2f-631, the VNFM or NFVO requests necessary resources for the CNF from the VIM 2a-221. At operation 2f-633, the VIM sends a response message for allocating the necessary resources for the CNF to the VNFM or NFVO.

At operation 2f-645, the VNFM or NFVO configures the CNF by allocating the resources to the CNF.

At operations 2f-647 and 2f-649 together with operation 2f-645, the VNFM or NFVO notifies the NF1 and the NF2 that the resources have been allocated or updated to the CNF.

That is, according to an embodiment, the resources being currently allocated to the CNF for slice 1 and slice 2 are 80 and 20, respectively, the resources requested for slice 1 and slice 2 are 100 and 30, respectively, and the total available resources of 120 are insufficient and thus they are scaled up from 120 to 130. In this case, an optimal condition is found and allocated by scaling up the resources to match the performance indexes and constraints for allocation of the resources of 100 and 30 for slice 1 and slice 2, respectively. That is, the total available resources are scaled up, and thereafter, the CNF is configured for each slice with the scaled-up resources.

Operation 2f-651 and the subsequent operations are selective operations. That is, in the case of managing the entity that controls the IoT service, such as NF2, that is, SMF2 and UPF2, as a selective operation for processing a specific service-specific operation, an example of the operation being selectively performed will be described as follows.

That is, the resources are allocated for detailed services in consideration of the performance in a state where among the newly allocated total resources of 130, the resources of 100 are allocated for slice 1 and the resources of 30 are allocated for slice 2.

At operation 2f-651, the NF2 transmits a request message for requesting the resources to the VNFM.

At operation 2f-655, the VNFM evaluates the resource usage status for the NF having received the request, and it notifies the NFVO of the resource usage status of the NF2. Further, the VNFM or NFVO evaluates the resource usage status for the NF having received the request. In this case, the VNFM or NFVO checks whether there are free resources that can be allocated.

Meanwhile, in addition to the checking of whether there are free resources, a bearer establishment success rate, a target service specific policy, or the QoS may be used as an evaluation reference.

At operation 2f-661, the VNFM or NFVO requests necessary resources for the NF2 from the VIM. At operation 2f-663, the VIM sends a response message for allocating the necessary resources for the NF2 to the VNFM or NFVO. At operation 2F-675, the VNFM configures the NF2 by allocating the resources to the NF2.

As shown in FIG. 2F, according to the technology of the disclosure, even in the resource allocation, the resource management is performed together with the entities commonly applied to the slices, and thus the optimal resource allocation can be performed with respect to the resource requests by slice 1 and slice 2 through not only the free resources but also evaluation of the resource usage or the performance index.

FIG. 2G is a diagram illustrating an example of a resource management flowchart according to an embodiment of the disclosure.

At operation 2g-701, free resources are checked.

At operation 2g-703, the current performance is evaluated.

At operation 2g-705, constraints exerting an influence on the current performance are defined.

At operation 2g-707, it is checked whether a target is given in relation to the performance or the like.

At operation 2g-709, an expected performance is evaluated.

At operation 2g-711, an expected required value is derived.

At operation 2g-713, in the case of using the required value, it is checked whether a critical constraint is satisfied.

If the critical constraint is not satisfied, it is identified, at operation 2g-715, whether extra required resources exist.

If the extra required resources exist, at operation 2g-717, the extra required resources are calculated to perform operation 2g-709.

If the critical constraint is satisfied, at operation 2g-719, it is checked whether the system performance is improved if a new required value is used.

If the system performance is not improved, at operation 2g-721, it is checked whether reevaluation is necessary by changing the value.

If the reevaluation is not necessary, at operation 2g-723, the required value is changed, and the reevaluation is performed.

If the system performance is improved, at operation 2g-725, the resources are allocated based on the new required value.

FIG. 2H is a diagram illustrating an example of a network system environment according to an embodiment of the disclosure.

In an embodiment of the disclosure, it is exemplified that network slice 1 is composed of UPF1 2h-131, SMF1 2h-121, AMF 2h-111, and 5G RAN (base station) 2h-103, and network slice 2 is composed of UPF2 2h-133, SMF2 2h-131, AMF 2h-111, and 5G RAN 2h-103. The 5G RAN 2h-103 may communicate with UE1 2h-101. In an embodiment, it is exemplified that network slice 1 and network slice 2 share the AMF and the 5G RAN, and schemes for managing common resources more efficiently if such common resources exist are proposed. Here, terms being used in a 5G system, such as a user plane function (UPF), a session management function (SMF), an access and mobility management function (AMF), and a 5G radio access network (RAN), are used to help understanding.

Figure 2I:
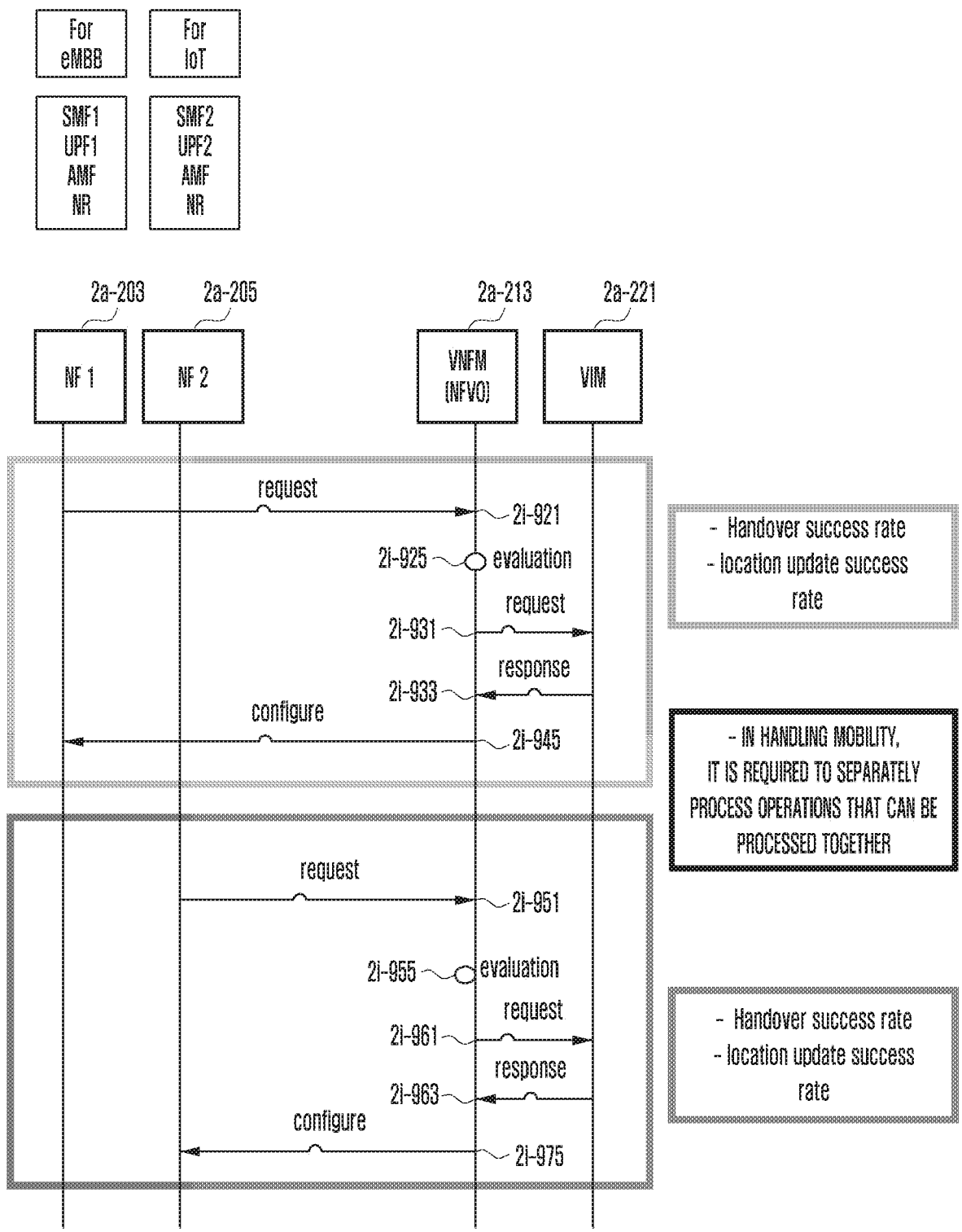
FIG. 2I is a diagram illustrating an example of a mobility management in the related art.

FIG. 2I is a diagram illustrating an example of a mobility management in the related art.

For example, it may be assumed that NF1 2a-203, which is for eMBB, is composed of an entity managing SMF1, UPF1, AMF, and 5G RAN, and NF2 2a-205 is composed of an entity managing SMF2, UPF2, AMF, and 5G RAN.

At operation 2i-921, the NF1 transmits a message for reporting a fault related to mobility management to the VNFM 2a-213. At operation 2i-925, the VNFM evaluates a resource usage status for the NF having received the report, and it notifies the NFVO of the resource usage status of the NF1. Further, the VNFM or NFVO evaluates the resource usage status for the NF having received the report. In this case, the VNFM or NFVO checks whether there are free resources that can be allocated.

Meanwhile, in relation to the performance indexes, the performance may be evaluated in consideration of a handover success rate or a location update success rate (tracking area update success rate), and then the evaluated performance may be used to request the necessary resources.

At operation 2i-931, the VNFM or NFVO requests necessary resources for the NF1 from the VIM 2a-221. At operation 2i-933, the VIM sends a response message for allocating the necessary resources for the NF1 to the VNFM or NFVO. At operation 2i-945, the VNFM configures the NF1 by allocating the resources to the NF1, and it sends the response message.

At operation 2i-951, the NF2 transmits a message for reporting a fault related to the mobility management to the VNFM. At operation 2i-955, the VNFM evaluates the resource usage status for the NF having received the report, and it notifies the NFVO of the resource usage status of the NF2. Further, the VNFM or NFVO evaluates the resource usage status for the NF having received the report. In this case, the VNFM or NFVO checks whether there are free resources that can be allocated.

Meanwhile, in relation to the performance indexes, the performance may be evaluated in consideration of a handover success rate or a location update success rate (tracking area update success rate), and then the evaluated performance may be used to request the necessary resources.

At operation 2i-961, the VNFM or NFVO requests necessary resources for the NF2 from the VIM. At operation 2i-963, the VIM sends a response message for allocating the necessary resources for the NF2 to the VNFM or NFVO. At operation 2i-975, the VNFM configures the NF2 by allocating the resources to the NF2, and it sends the response message.

As shown in FIG. 2I, in the mobility management in the related art, inefficiency may occur due to separate processing of operations that can be processed together.

Figure 2J:
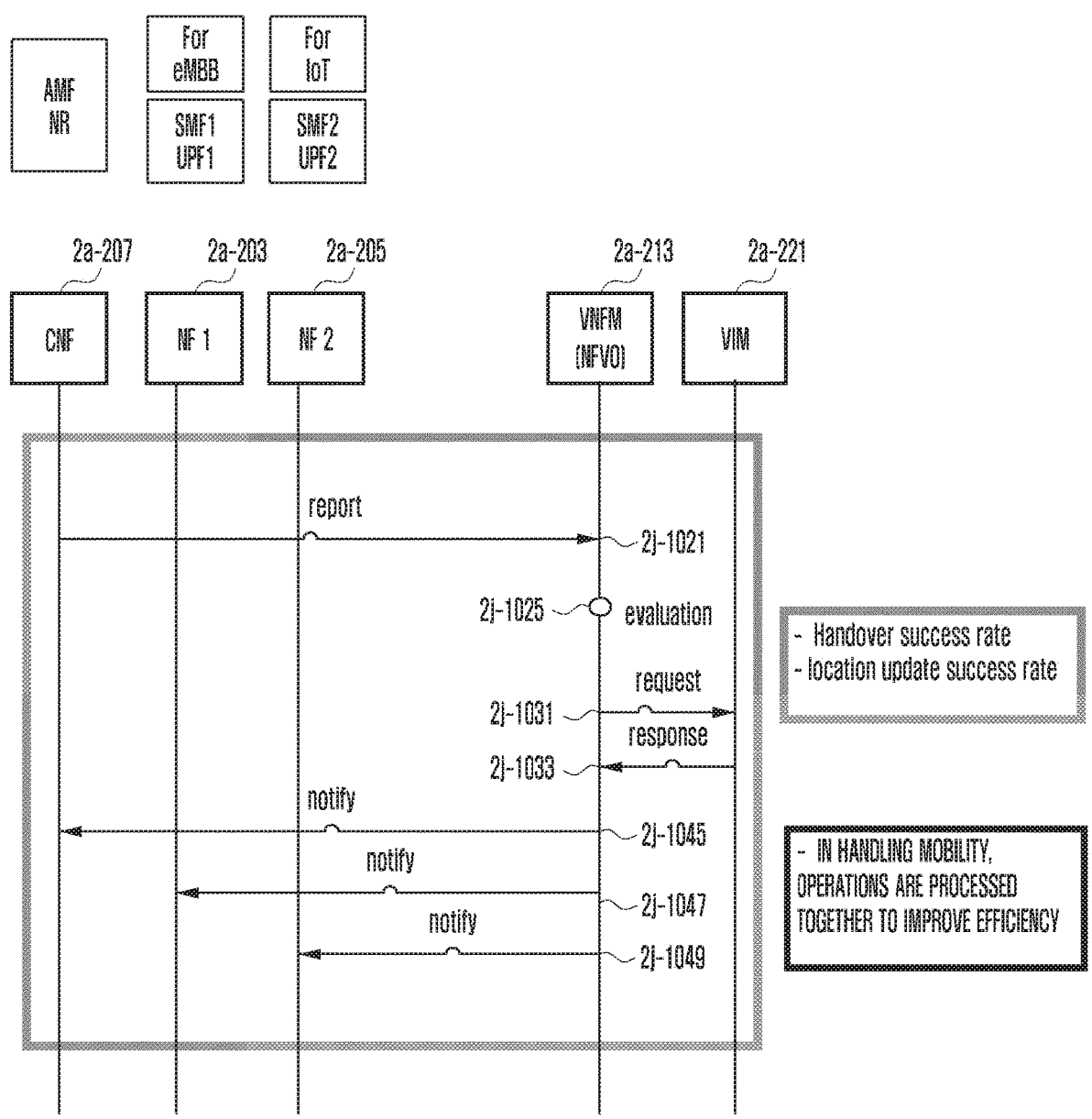
FIG. 2J is a diagram illustrating an example of a mobility management according to an embodiment of the disclosure.

FIG. 2J is a diagram illustrating an example of a mobility management according to an embodiment of the disclosure.

For example, it may be assumed that NF1 2a-203, which is for eMBB, is composed of an entity managing SMF1 and UPF1, and NF2 2a-205 is composed of an entity managing SMF2 and UPF2. Meanwhile, it may be assumed that the common network function (CNF) 2a-207 is composed of an entity managing the AMF and 5G RAN.

At operation 2j-1021, the CNF transmits a message for reporting a fault related to mobility management to the VNFM 2a-213. At operation 2j-1025, the VNFM evaluates a resource usage status for the NF having received the report, and it notifies the NFVO of the resource usage status of the CNF. Further, the VNFM or NFVO evaluates the resource usage status for the CNF having received the report. In this case, the VNFM or NFVO checks whether there are free resources that can be allocated.

At operation 2j-1025 composed of an entity operation commonly related to a slice, it is possible to check the free resources through evaluation of the resources, to evaluate a related performance index in managing the mobility, to find constraints exerting an influence on the performance accordingly, and to determine whether to increase or maintain the resources. In this case, a handover success rate or a location update success rate (e.g., tracking area update success rate or the like) may be used as the performance index.

At operation 2j-1031, the VNFM or NFVO requests necessary resources for the CNF to the VIM 2a-221. At operation 2j-1033, the VIM sends a response message for allocating the necessary resources for the CNF to the VNFM or NFVO. At operation 2j-1045, the VNFM or NFVO configures the CNF by allocating the resources to the CNF, and it sends the response message. At operations 2j-1047 and 2j-1049 together with the operation 2j-1045, the VNFM or NFVO notifies the NF1 and NF2 that resources have been allocated to the CNF. As shown in FIG. 2J, even in the mobility management, efficiency can be improved through management of portions common to slice 1 and slice 2.

Figure 2K:
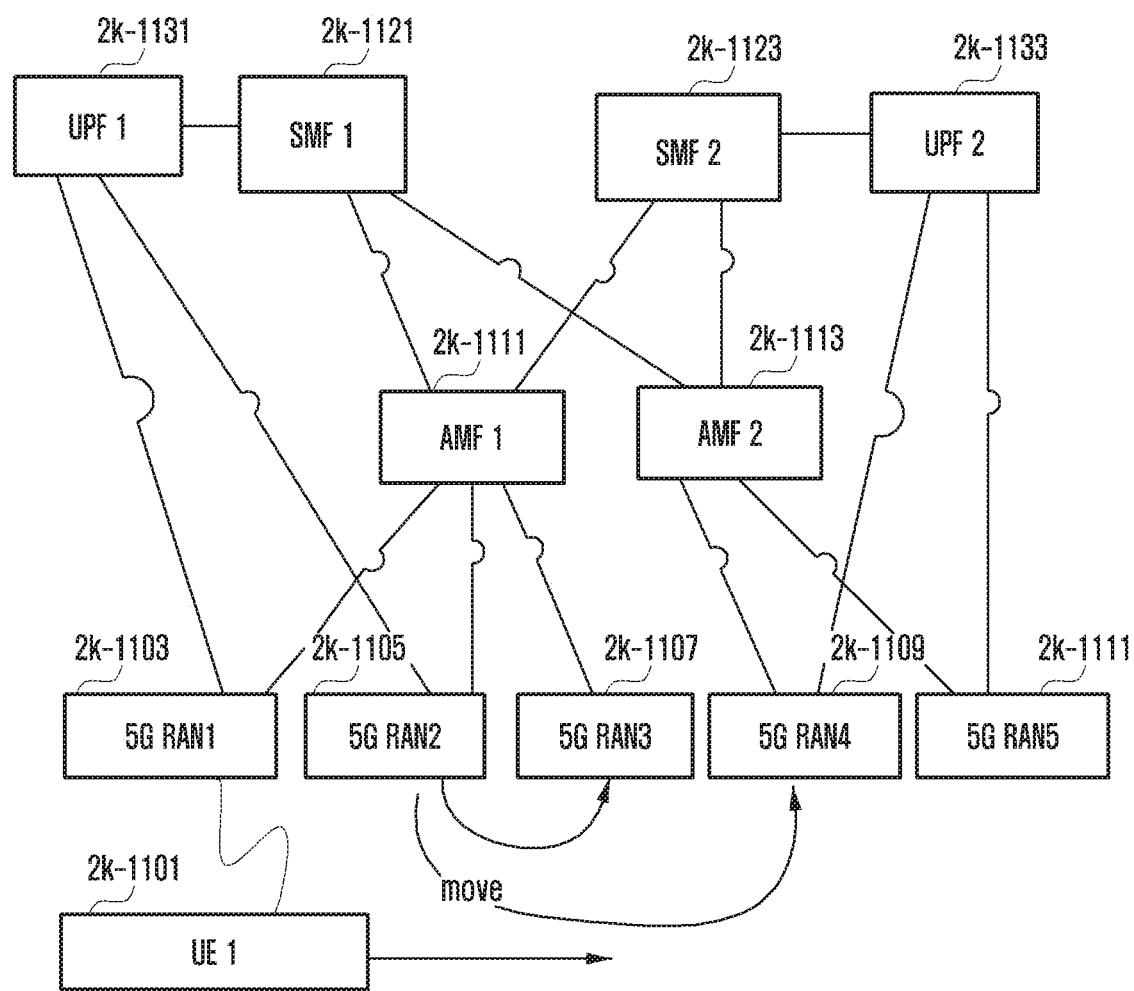
FIG. 2K is a diagram illustrating an example of a system environment for mobility management according to an embodiment of the disclosure.

FIG. 2K is a diagram illustrating an example of a system environment for mobility management according to an embodiment of the disclosure. In an embodiment of the disclosure, it is exemplified that UE1 2k-1101 moves in a network composed of UPF1 2k-1131, SMF1 2k-1121, AMF1 2k-1111, UPF2 2k-1133, SMF2 2k-1123, AMF2 2k-1113, and 5G RAN 1 to 5 2k-1103 to 2k-1111.

Third Embodiment

Figure 3A:
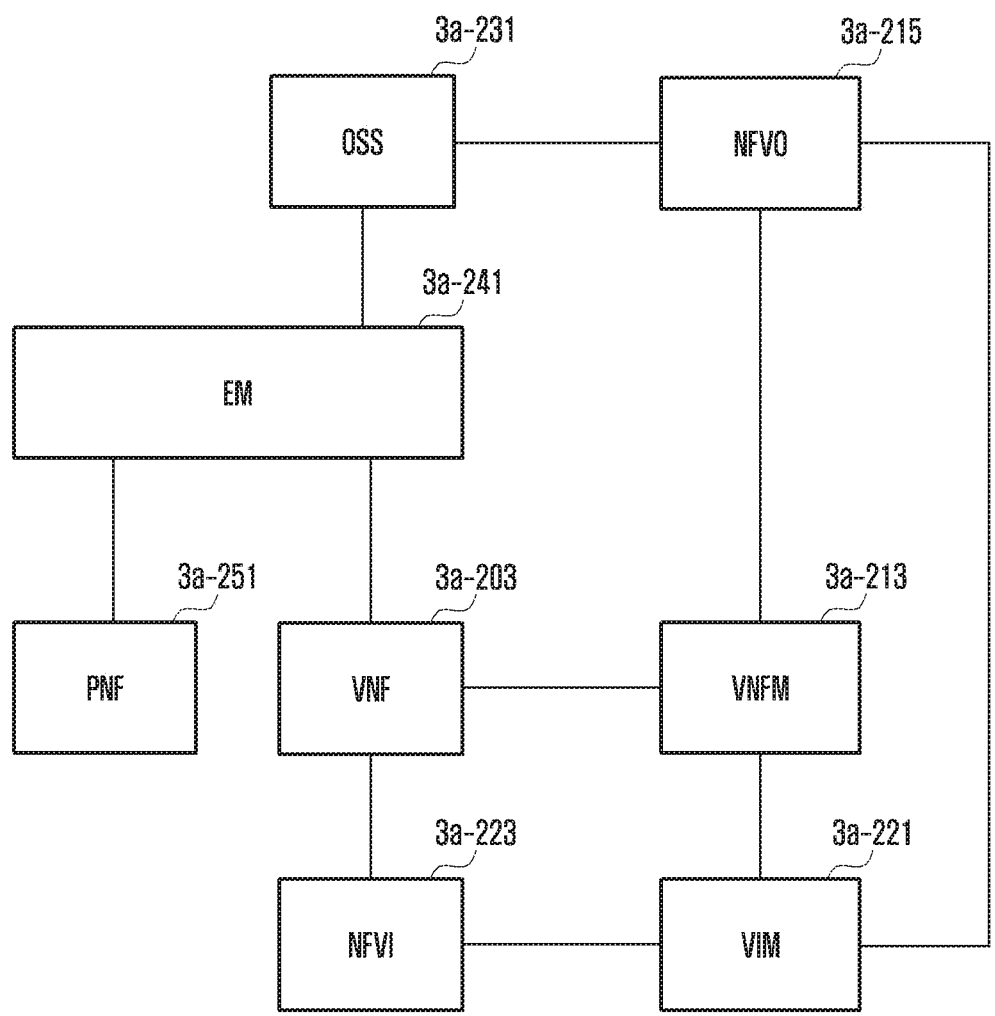
FIG. 3A is a diagram illustrating an example of a 5G system management environment according to an embodiment of the disclosure.

FIG. 3A is a diagram illustrating an example of a 5G system management environment according to an embodiment of the disclosure.

With reference to FIG. 3A, a 5G system may include a network functions virtualization orchestrator (NFVO) 3a-215, a virtualized network function manager (VNFM) 3a-213, a virtualized infrastructure management (VIM) 3a-221, a network function virtualization infrastructure (NFVI) 3a-223, an operation support system (OSS) 3a-231, and an element manager (EM) 3a-241. Further, a network function (NF) may be composed of a virtual network function (VNF) 3a-203, a physical network function (PNF) 3a-251, and the like.

Although it is assumed that a communication network on the basis of the disclosure is a 5G network, it can be applied if the same concept is applied event to other systems within the category that can be understood by those of ordinary skill in the art. Meanwhile, it is assumed that the disclosure has an environment in which a virtualized network is used in the 5G system. In the case of the virtualized network function, it includes the function so called the virtualized network function management for managing the virtualized network function and the NFVO for controlling the function as a whole, and it takes part in the orchestration, that is, the overall control. Resources of such entities are virtually gathered and commonly called the network functions virtualization infrastructure (NFVI). Further, such resources are managed by the virtualized infrastructure manager (VIM).

Figure 3B:
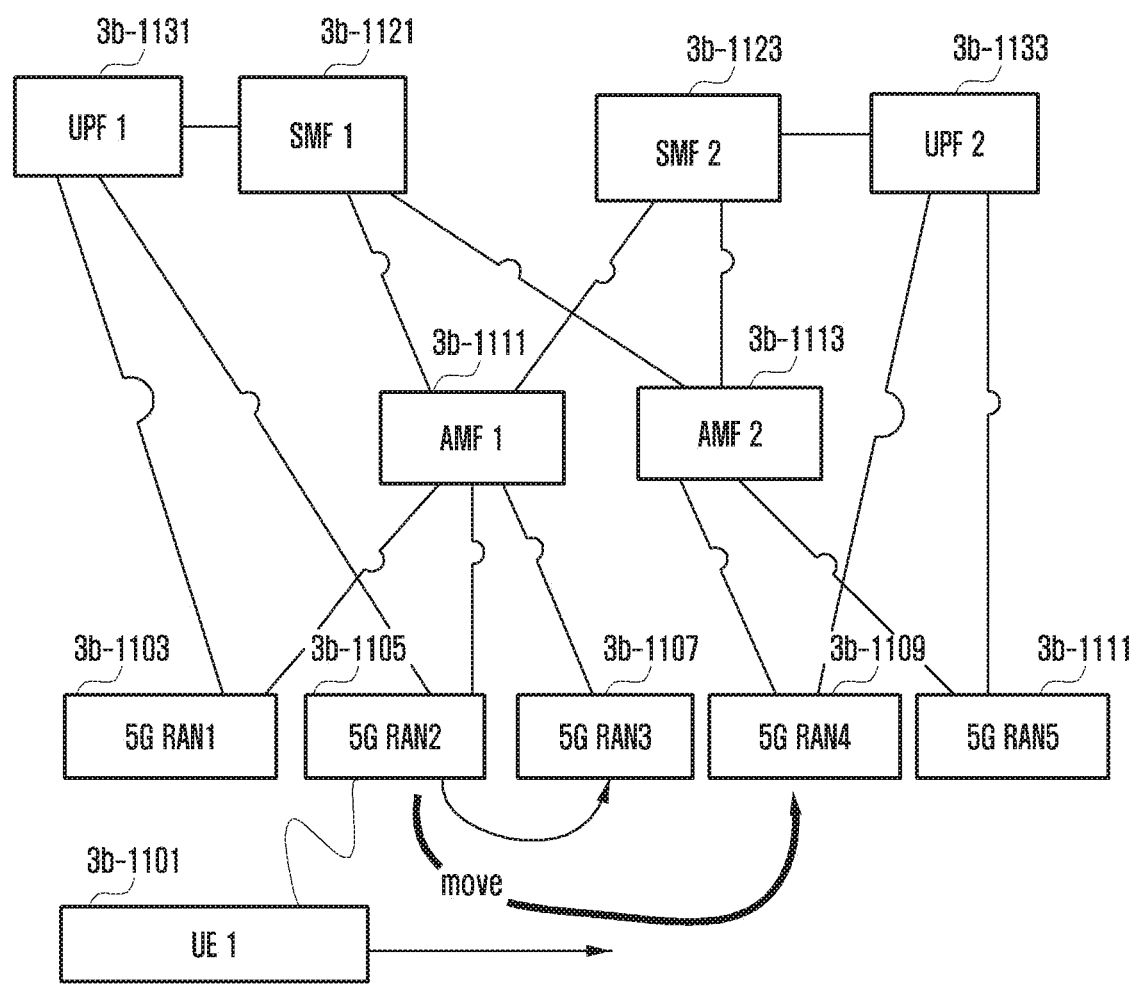
FIG. 3B is a diagram illustrating an example of a 5G system mobility environment according to an embodiment of the disclosure.

FIG. 3B is a diagram illustrating an example of a 5G system mobility environment according to an embodiment of the disclosure.

In an embodiment of the disclosure, it is exemplified that UE1 3b-1101 moves in a network composed of UPF1 3b-1131, SMF1 3b-1121, AMF1 3b-1111, UPF2 3b-1133, SMF2 3b-1123, AMF2 3b-1113, and 5G RAN 1 to 5G RAN 5 3b-1103 to 3b-1111.

Here, the terms being used in a 5G system, such as a user plane function (UPF), a session management function (SMF), an access and mobility management function (AMF), and a 5G radio access network (RAN), are used.

Figure 3C:
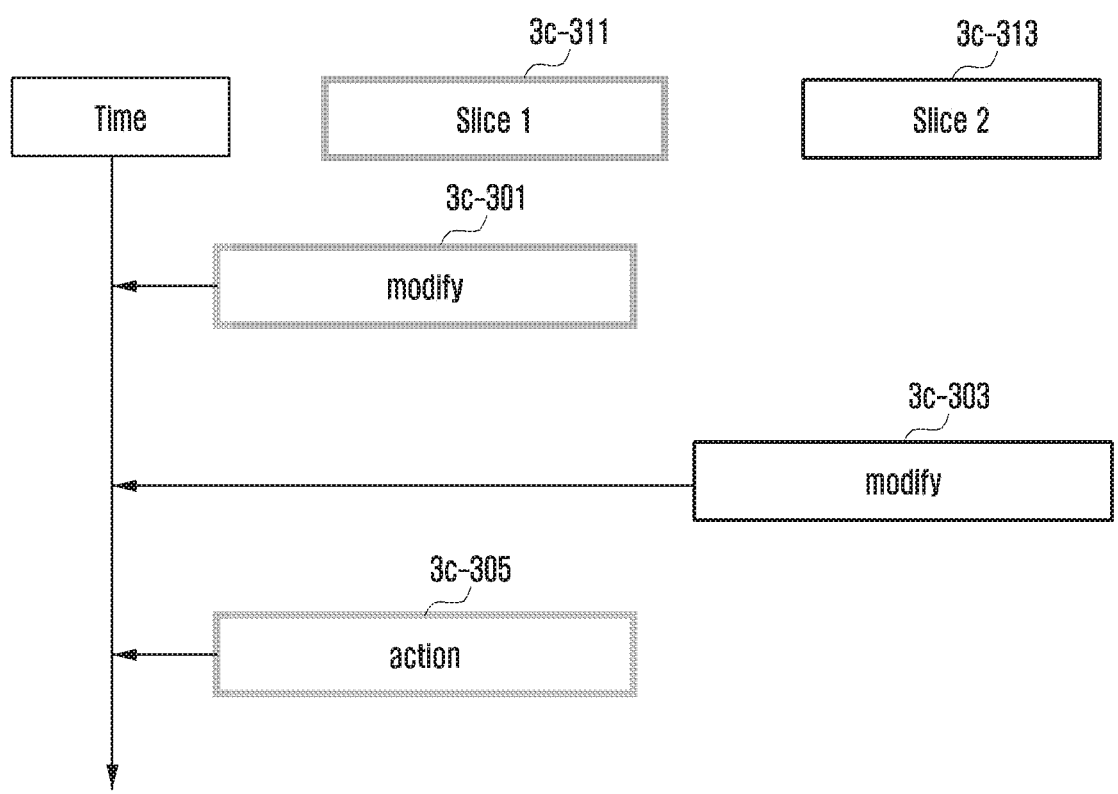
FIG. 3C is a diagram illustrating an example in which a conflict occurs in a resource management according to an embodiment of the disclosure.

FIG. 3C is a diagram illustrating an example in which a conflict occurs in a resource management according to an embodiment of the disclosure.

In FIG. 3C, 3c-311 denotes network slice 1, and 3c-313 denotes network slice 2.

At operation 3c-301, it is assumed that network slice 1 is modified, and such network slice 1 is composed of a VNF.

At operation 3c-303, if network slice 2 uses some of resources used by network slice 1, and network slice 1 and network slice 2 share parameters managing the resources, a value that is changed at operation 3c-303 may exert an influence on a value that is set at operation 3c-301.

At operation 3c-305, network slice 1 takes a necessary action with respect to the parameters modified at operation 3c-301 and then modified again at operation 3c-303.

Figure 3D:
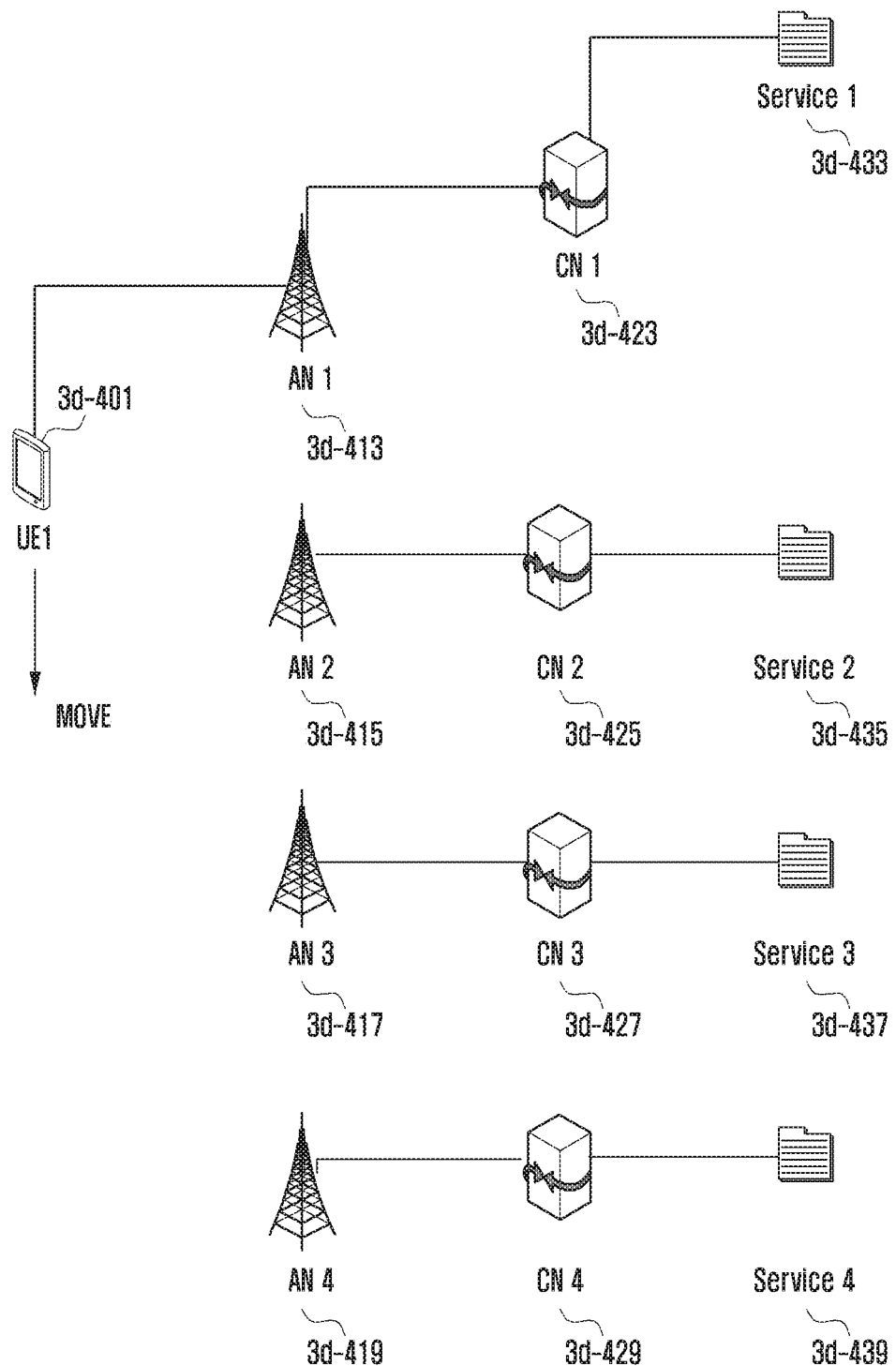
FIG. 3D is a diagram illustrating an example of the configuration of a 5G system network slice according to an embodiment of the disclosure.

FIG. 3D is a diagram illustrating an example of the configuration of a 5G system network slice according to an embodiment of the disclosure. A network slice may be composed of entities 3d-423 to 3d-429 composed of access networks (AN) 3d-413 to 3d-419, that is, 5G radio access networks (RAN), and a core network (CN), and the network slice may be configured in accordance with services 3d-433 to 3d-439. UE1 3d-401 may move in the network.

Figure 3E:
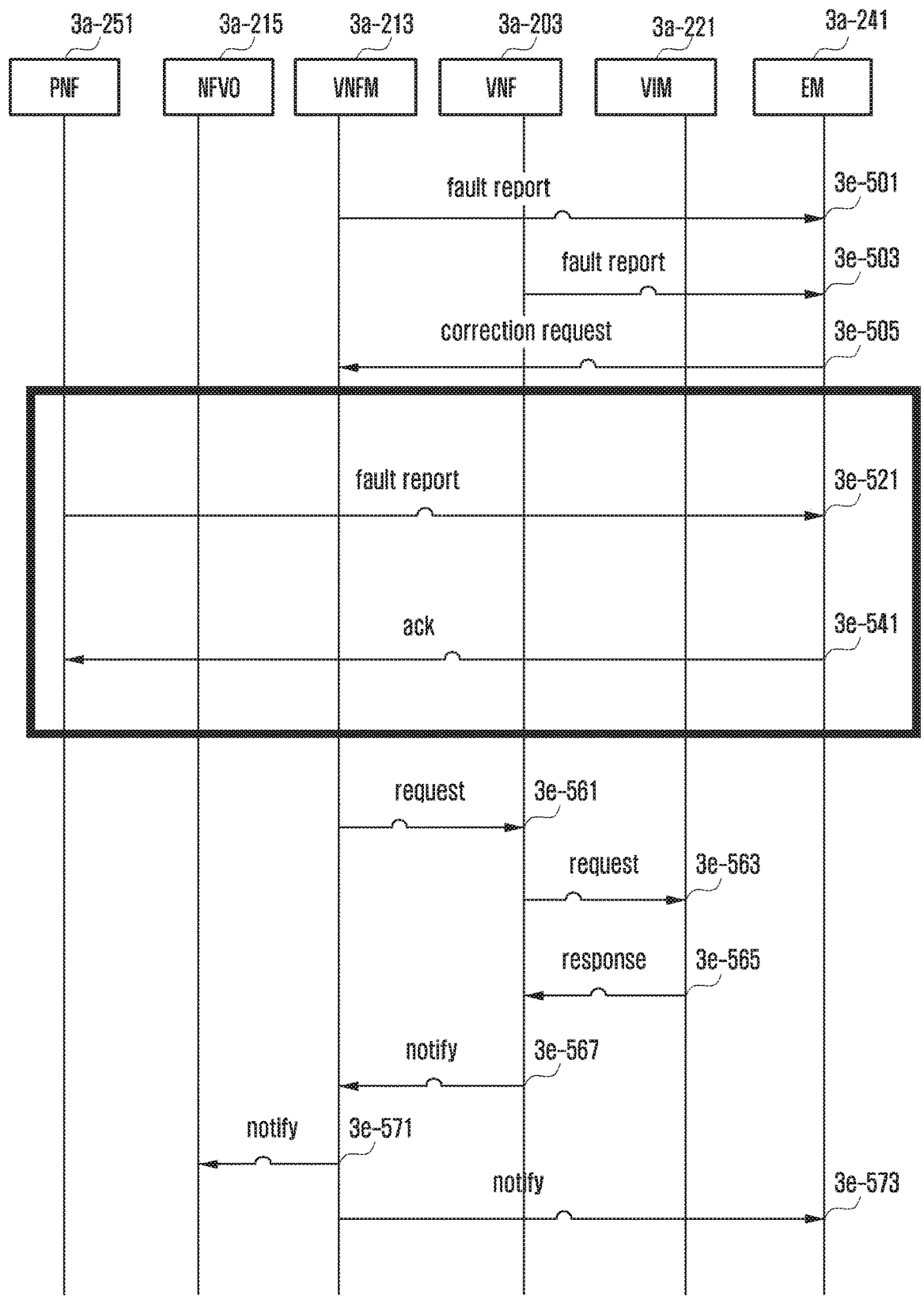
FIG. 3E is a diagram illustrating an example of a conflict error occurrence of a resource management and a corresponding process in the related art.

FIG. 3E is a diagram illustrating an example of a conflict error occurrence of a resource management and a corresponding process in the related art.

At operation 3e-501, the VNFM 3a-213 transmits a fault report message to an EM 3a-241.

At operation 3e-503, the VNF 3a-203 transmits a fault report message to the EM.

At operation 3e-505, the EM transmits a correction request message to the VNFM.

At operation 3e-521, the PNF 3a-251 transmits a fault report message to the EM.

At operation 3e-541, the EM transmits an ack message to the PNF.

In this case, due to the operations 3e-521 and 3e-541, an override or a conflict may occur in the resources or parameters shared by the PNF or VNF 3a-203 with the EM.

At operation 3e-561, the VNFM sends a request message for fault correction to the VNF.

At operation 3e-563, the VNF sends a request message for requesting resources to the VIM 3a-221.

At operation 3e-565, the VIM sends a response message for responding to the resource request to the VNF. In this case, the resources may be allocated and transmitted.

At operation 3e-567, the VNF notifies the VNFM of the fault correction result.

At operation 3e-571, the VNFM notifies the NFVO 3a-215 of the fault correction result for the VNF.

At operation 3e-573, the VNFM notifies the EM of the fault correction result for the VNF.

Figure 3F:
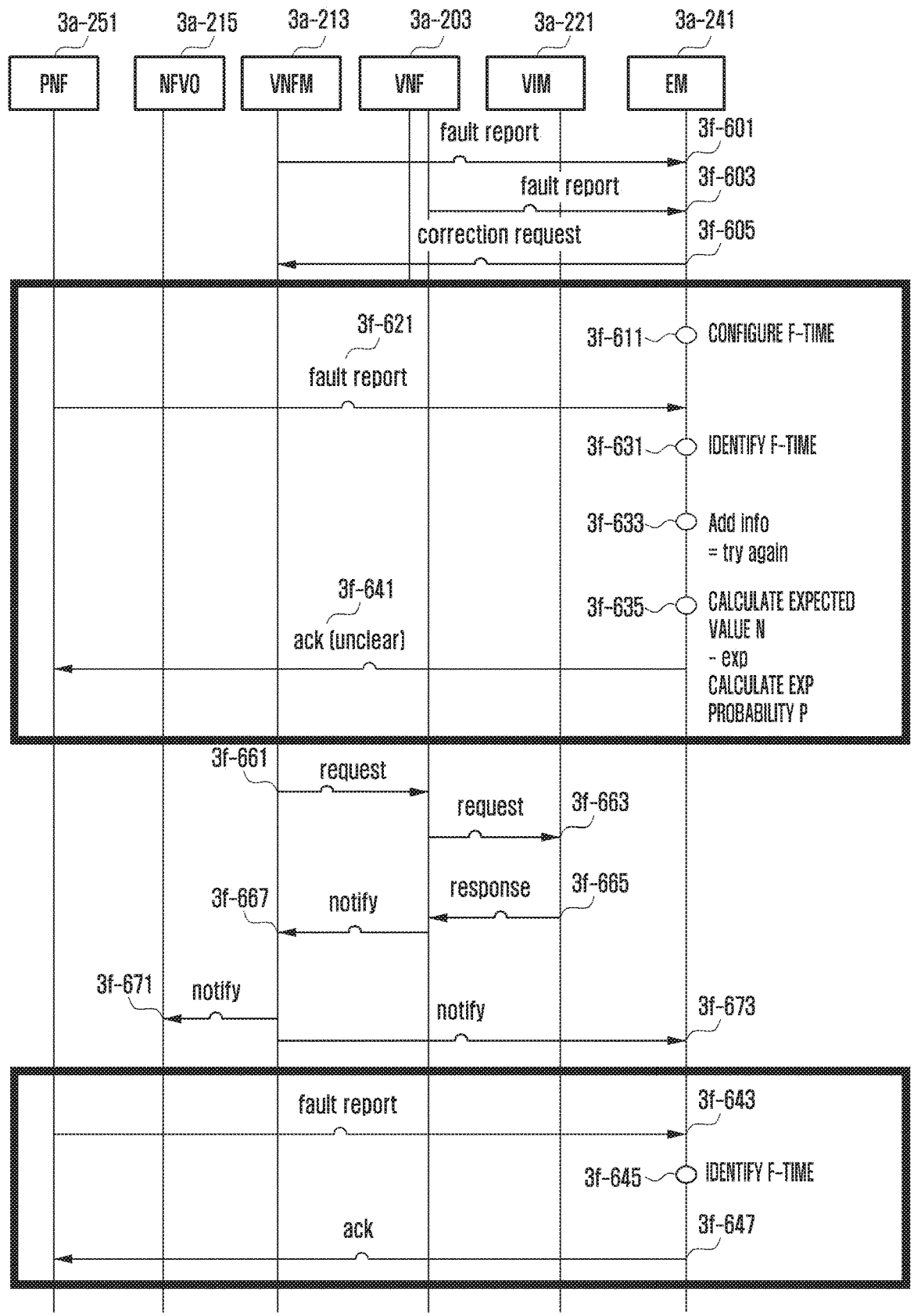
FIG. 3F is a diagram illustrating an example of a scheme for solving a conflict error of a resource management if such a conflict error occurs according to an embodiment of the disclosure.

FIG. 3F is a diagram illustrating an example of a scheme for solving a conflict error of a resource management if such a conflict error occurs according to an embodiment of the disclosure.

At operation 3f-601, the VNFM 3a-213 transmits a fault report message to the EM 3a-241.

At operation 3f-603, the VNF 3a-203 transmits a fault report message to the EM.

At operation 3f-605, the EM transmits a correction request message to the VNFM.

At operation 3f-611, in order to prevent the common use of variables or values of parameters being used by the VNF 3a-203 and the PNF 3a-251 in the EM or in order to prevent the values from being affected, an f-time is configured, which is a timer for freezing the variables so as to prevent the PNF from changing the variable values for a time required for the EM to correct the fault for the VNF. As an example, the f-time may be f-time=x (in the unit of ms, x is a positive integer), and according to the above-described example, the f-time may be f-time=5 msec. However, this merely corresponds to an embodiment of the disclosure, and thus the scope of the disclosure should not be limited to the above-described embodiment.

At operation 3f-621, the PNF transmits a fault report message to the EM.

At operation 3f-631, by the fault report message that the PNF has sent to the EM, it is checked whether the f-time value was previously configured in the EM in order to prevent the change of the variables through operation 3f-631. In an embodiment of the disclosure, although it is exemplified that the f-time is presented as the positive integer, and if the value is counted down to 0, the freezing status is released, another embodiment is also possible, in which the freezing status is released if the value reaches a negative integer.

At operation 3f-633, a method for notifying of information "try again" in an add information field of an ack message that is sent from the EM to the PNF may be used. At operation 3f-635, the EM may calculate an expected value for the shared parameter, and for example, it may derive "expected value=n" through the calculation. Further, an expected probability p is calculated for the corresponding value. If the expected probability p has a value that is better than a reference value, the expected value n is chosen.

At operation 3f-641, the ack message is transmitted from the EM to the PNF. The ack message may notify of the contents notifying of "unclear" that the fault of the fault report has not been solved, "try again" in the add information field, and the f-time value configured as the freezing time to retry the fault correction after the time.

In this case, due to the operations 3f-621 and 3f-641, an override or a conflict may occur in the resources or parameters shared by the PNF or VNF with the EM.

At operation 3f-661, the VNFM sends a request message for fault correction to the VNF.

At operation 3f-663, the VNF sends a request message for requesting resources to the VIM 3a-221.

At operation 3f-665, the VIM sends a response message for responding to the resource request to the VNF. In this case, the resources may be allocated and transmitted.

At operation 3f-667, the VNF notifies the VNFM of the fault correction result.

At operation 3f-671, the VNFM notifies the NFVO 3a-215 of the fault correction result for the VNF.

At operation 3f-673, the VNFM notifies the EM of the fault correction result for the VNF.

After the lapse of time as long as the f-time, as at operation 3f-643, the PNF retries the fault report message to the EM. At operation 3f-645, the EM checks whether the configured f-time elapses to become 0 or a negative value.

Thereafter, at operation 3f-647, the ack message is transmitted from the EM to the PNF.

Figure 3G:
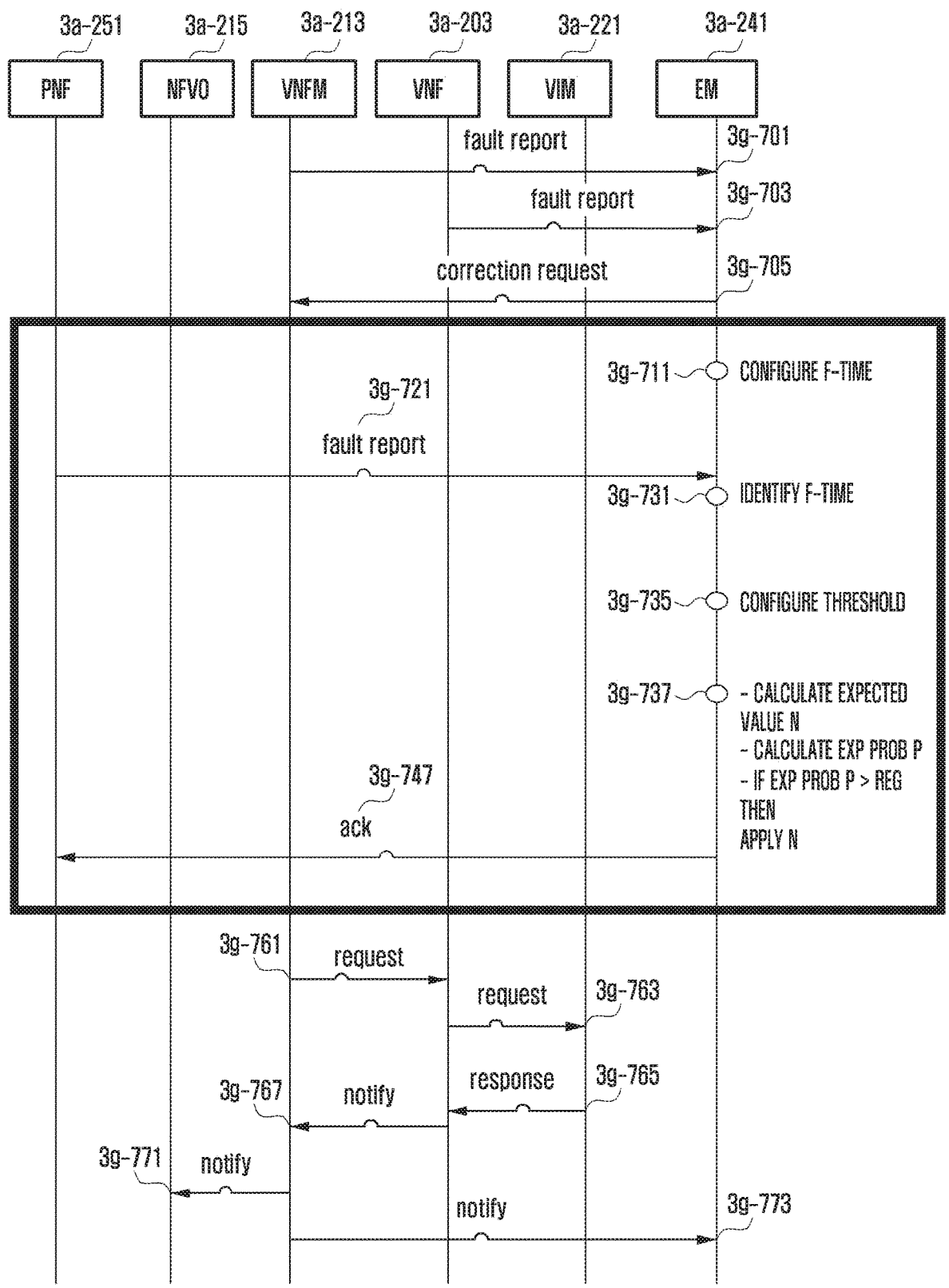
FIG. 3G is a diagram illustrating an example of a scheme for solving a conflict error of a resource management if such a conflict error occurs according to an embodiment of the disclosure.

FIG. 3G is a diagram illustrating an example of a scheme for solving a conflict error of a resource management if such a conflict error occurs according to another embodiment of the disclosure.

At operation 3g-701, the VNFM 3a-213 transmits a fault report message to the EM 3a-241.

At operation 3g-703, the VNF 3a-203 transmits a fault report message to the EM.

At operation 3g-705, the EM transmits a correction request message to the VNFM.

At operation 3g-711, in order to prevent the common use of variables or values of parameters being used by the VNF and the PNF 3a-251 in the EM or in order to prevent the values from being affected, an f-time is configured, which is a timer for freezing the variables so as to prevent the PNF from changing the variable values for a time required for the EM to correct the fault for the VNF. As an example, the f-time may be f-time=x (in the unit of ms, x is a positive integer), and according to the above-described example, the f-time may be f-time=5 msec. However, this merely corresponds to an embodiment of the disclosure, and thus the scope of the disclosure should not be limited to the above-described embodiment.

At operation 3g-721, the PNF transmits a fault report message to the EM.

At operation 3g-731, by the fault report message that the PNF has sent to the EM, it is checked whether the f-time value was previously configured in the EM in order to prevent the change of the variables through operation 3g-731. In an embodiment of the disclosure, although it is exemplified that the f-time is presented as the positive integer, and if the value is counted down to 0, the freezing status is released, another embodiment is also possible, in which the freezing status is released if the value reaches a negative integer.

At operation 3g-735, the EM configures a threshold value. Through the configuration of the threshold value, if the f-time drops off below the configured value, the VNF is not affected even if the value is changed by the PNF as at operation 3g-737, and thus the f-time is used as a timer counting the value.

At operation 3g-737, the EM may calculate an expected value for the shared parameter, and for example, it may derive "expected value=n" through the calculation.

Further, an expected probability p is calculated for the corresponding value.

If the expected probability p has a value that is better than a reference value, the expected value n is chosen.

At operation 3g-747, the ack message is transmitted from the EM to the PNF.

In this case, due to the operations 3g-721 and 3g-747, an override or a conflict may occur in the resources or parameters shared by the PNF or VNF with the EM.

At operation 3g-761, the VNFM sends a request message for fault correction to the VNF.

At operation 3g-763, the VNF sends a request message for requesting resources to the VIM 3a-221.

At operation 3g-765, the VIM sends a response message for responding to the resource request to the VNF. In this case, the resources may be allocated and transmitted.

At operation 3g-767, the VNF notifies the VNFM of the fault correction result.

At operation 3g-771, the VNFM notifies the NFVO 3a-215 of the fault correction result for the VNF.

At operation 3g-773, the VNFM notifies the EM of the fault correction result for the VNF.

Figure 3H:
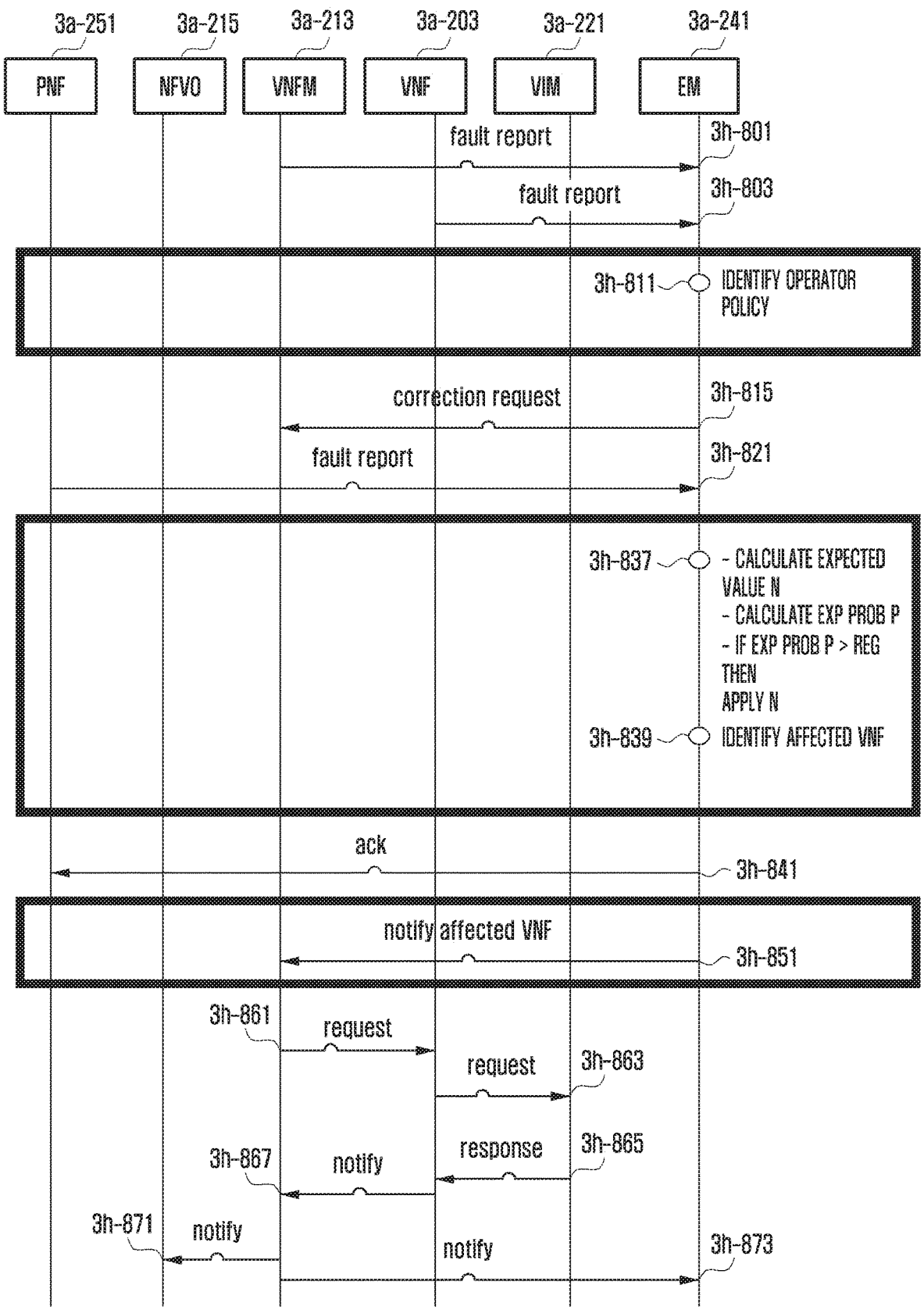
FIG. 3H is a diagram illustrating an example of a scheme for solving a conflict error of a resource management if such a conflict error occurs according to another embodiment of the disclosure.

FIG. 3H is a diagram illustrating an example of a scheme for solving a conflict error of a resource management if such a conflict error occurs according to another embodiment of the disclosure.

At operation 3h-801, the VNFM 3a-213 transmits a fault report message to the EM 3a-241.

At operation 3h-803, the VNF 3a-203 transmits a fault report message to the EM.

At operation 3h-811, the EM checks the policy of an operator.

At operation 3h-815, the EM transmits a correction request message to the VNFM.

At operation 3h-821, the PNF 3a-251 transmits a fault report message to the EM.

At operation 3h-837, the EM may calculate an expected value for the shared parameter, and for example, it may derive "expected value=n" through the calculation.

Further, an expected probability p is calculated for the corresponding value.

If the expected probability p has a value that is better than a reference value, the expected value n is chosen.

At operation 3g-839, the EM finds the VNF that is affected by the fault report of the PNF. In this case, the EM finds the affected VNF using correlation or the like.

At operation 3h-841, the ack message is transmitted from the EM to the PNF.

In this case, due to the operations 3h-821 and 3h-841, an override or a conflict may occur in the resources or parameters shared by the PNF or VNF with the EM.

At operation 3h-851, the EM notifies the VNFM of the change of the value of the VNF that is grasped to be affected at operation 3h-839.

At operation 3h-861, the VNFM sends a request message for fault correction to the VNF.

At operation 3h-863, the VNF sends a request message for requesting resources to the VIM 3a-221.

At operation 3h-865, the VIM sends a response message for responding to the resource request to the VNF. In this case, the resources may be allocated and transmitted.

At operation 3h-867, the VNF notifies the VNFM of the fault correction result.

At operation 3h-871, the VNFM notifies the NFVO 3a-215 of the fault correction result for the VNF.

At operation 3h-873, the VNFM notifies the EM of the fault correction result for the VNF.

An entity and/or electronic device according to various embodiments of the disclosure may include at least one processor (controller) controlling the overall operation of the corresponding device and a transceiver transmitting and receiving signals under the control of the processor.

Embodiments of the disclosure that are described in the specification and drawings are merely for easy explanation of the technical contents of the disclosure and proposal of specific examples to help understanding of the disclosure, but are not intended to limit the scope of the disclosure. That is, it will be apparent to those of ordinary skill in the art to which the disclosure pertains that other modified examples that are based on the technical idea of the disclosure can be embodied. Further, according to circumstances, the respective embodiments may be operated in combination. For example, parts of the methods proposed in the disclosure may be combined with each other to operate the base station and the terminal. Further, although the above-described embodiments are proposed based on an LTE/LTE-A system, other modification examples based on the technical idea of the embodiments could be embodied even in other systems, such as 5G and NR systems.

The invention claimed is:

1. An authentication method performed by a terminal in a wireless communication system, the method comprising:
    transmitting a first message requesting session establishment to a session management function (SMF) via an access and mobility management function (AMF);
    receiving a second message including an extensible authentication protocol (EAP) success message for authentication success from the SMF via the AMF in response to the first message;
    receiving, a third message for requesting an authentication of the terminal from the SMF via the AMF, the third message including an EAP request message; and
    transmitting a fourth message to the SMF via the AMF, in response to the third message, the fourth message including first information for identifying the fourth message and second information associated with the authentication of the terminal,
    wherein the second information comprises an information element identifier (IEI) of the second information, a length of contents of the second information, and the contents of the second information.

2. The method of claim 1, wherein the second message including the EAP success message comprises an information element identifier (IEI), a length of contents, and the contents of the EAP success message.

3. A method performed by a session management function (SMF) for authenticating a terminal in a wireless communication system, the method comprising:
    receiving a first message requesting session establishment from the terminal via an access and mobility management function (AMF);
    transmitting a second message including an extensible authentication protocol (EAP) success message for authentication success to the terminal via the AMF in response to the first message;
    transmitting a third message for requesting an authentication of the terminal to the terminal via the AMF, the third message including an EAP request message; and
    receiving a fourth message from the terminal via the AMF, in response to the third message, the fourth message including first information for identifying the fourth message and second information associated with the authentication of the terminal,
    wherein the second information comprises an information element identifier (ID) of the second information, a length of contents of the second information, and the contents of the second information.

4. The method of claim 3, wherein the second message including the EAP success message comprises an information element identifier (IED, a length of contents, and the contents of the EAP success message.

5. A terminal in a wireless communication system, the terminal comprising:
    a transceiver configured to transmit and receive signals; and
    at least one processor configured to control to:
        transmit a first message requesting session establishment to a session management function (SMF) via an access and mobility management function (AMF),
        receive a second message including an extensible authentication protocol (EAP) success message for authentication success from the SMF via the AMF in response to the first message,
        receive a third message for requesting an authentication of the terminal from the SMF via the AMF, the third message including an EAP request message, and
        transmit a fourth message to the SMF via the AMF, in response to the third message, the fourth message including first information for identifying the fourth message and second information associated with the authentication of the terminal,
    wherein the second information comprises an information element identifier (IEI) of the second information, a length of contents of the second information, and the contents of the second information.

6. The terminal of claim 5, wherein the second message including the EAP success message comprises an information element identifier (IEI), a length of contents, and the contents of the EAP success message.

7. A session management function (SMF) in a wireless communication system, the SMF comprising:
    a transceiver configured to transmit and receive signals; and
    at least one processor configured to control to:
        receive a first message requesting session establishment from a terminal via an access and mobility management function (AMF),
        transmit a second message including an extensible authentication protocol (EAP) success message for authentication success to the terminal via the AMF in response to the first message,
        transmit a third message for requesting an authentication of the terminal to the terminal via the AMF, the third message including an EAP request message, and
        receive a fourth message from the terminal via the AMF, in response to the third message, the fourth message including first information for identifying the fourth message and second information associated with the authentication of the terminal,
    wherein the second information comprises an information element identifier (IEI) of the second information, a length of contents of the second information, and the contents of the second information.

8. The SMF of claim 7, wherein the second message including the EAP success message comprises an information element identifier (IEI), a length of contents, and the contents of the EAP success message.

9. The method of claim 1,
    wherein the first message is a non-access stratum (NAS) message for a session establishment request, and wherein the first message is transmitted with an EAP response message for security authentication.

10. The method of claim 1,
wherein the fourth message further includes an extended protocol discriminator and a procedure transaction identity.

\* \* \* \* \*